United States Patent
Liao et al.

(10) Patent No.: US 7,480,416 B2
(45) Date of Patent: Jan. 20, 2009

(54) IMPLEMENTATION OF DISCRETE WAVELET TRANSFORM USING LIFTING STEPS

(75) Inventors: Hongyu Liao, Edmonton (CA); Mrinal K. Mandal, Edmonton (CA); Bruce F. Cockburn, Edmonton (CA)

(73) Assignee: Telecommunications Research Laboratories, Edmonton (CA)

( * ) Notice: Subject to any disclaimer, the term of this patent is extended or adjusted under 35 U.S.C. 154(b) by 723 days.

(21) Appl. No.: 10/435,499

(22) Filed: May 9, 2003

(65) Prior Publication Data
US 2004/0223655 A1 Nov. 11, 2004

(51) Int. Cl.
G06K 9/36 (2006.01)
G06K 9/46 (2006.01)
G06K 9/40 (2006.01)
H04B 1/66 (2006.01)
H04N 11/02 (2006.01)
H04N 11/04 (2006.01)
H04N 7/12 (2006.01)

(52) U.S. Cl. ............... 382/240; 382/254; 375/240.1
(58) Field of Classification Search ............ 382/240, 382/254; 375/240.01
See application file for complete search history.

(56) References Cited

U.S. PATENT DOCUMENTS

| 5,347,479 | A | | 9/1994 | Miyazaki | 364/725 |
|---|---|---|---|---|---|
| 5,757,432 | A | | 5/1998 | Dulong et al. | 348/384 |
| 5,763,961 | A | * | 6/1998 | Dreyer et al. | 307/116 |
| 5,974,097 | A | * | 10/1999 | Julyan et al. | 375/340 |
| 5,984,514 | A | | 11/1999 | Greene et al. | 364/715.02 |
| 6,014,897 | A | * | 1/2000 | Mo | 73/628 |
| 6,182,102 | B1 | | 1/2001 | Ramachandran | 708/313 |
| 6,236,684 | B1 | | 5/2001 | Wu | 375/240.19 |
| 6,654,467 | B1 | * | 11/2003 | York et al. | 381/71.14 |
| 6,785,700 | B2 | * | 8/2004 | Masud et al. | 708/400 |
| 2001/0033698 | A1 | | 10/2001 | Yip | 382/260 |
| 2002/0028022 | A1 | * | 3/2002 | Fukuhara et al. | 382/240 |

(Continued)

OTHER PUBLICATIONS

Ian Kaplan, "Wavelet and Signal Processing", Aug. 16, 2002, http://www.bearcave.com/misl/misl_tech/wavelets/.*

(Continued)

Primary Examiner—Matthew C Bella
Assistant Examiner—Randolph Chu
(74) Attorney, Agent, or Firm—Christensen O'Connor Johnson Kindness PLLC

(57) ABSTRACT

Compact and efficient hardware architectures for implementing lifting-based DWTs, including 1-D and 2-D versions of recursive and dual scan architectures. The 1-D recursive architecture exploits interdependencies among the wavelet coefficients by interleaving, on alternate clock cycles using the same datapath hardware, the calculation of higher order coefficients along with that of the first-stage coefficients. The resulting hardware utilization exceeds 90% in the typical case of a 5-stage 1-D DWT operating on 1024 samples. The 1-D dual scan architecture achieves 100% datapath hardware utilization by processing two independent data streams together using shared functional blocks. The 2-D recursive architecture is roughly 25% faster than conventional implementations, and it requires a buffer that stores only a few rows of the data array instead of a fixed fraction (typically 25% or more) of the entire array. The 2-D dual scan architecture processes the column and row transforms simultaneously, and the memory buffer size is comparable to existing architectures. The recursive and dual scan architectures can be readily extended to the N-D case.

15 Claims, 17 Drawing Sheets

U.S. PATENT DOCUMENTS

| | | | |
|---|---|---|---|
| 2002/0078112 A1 | 6/2002 | Majani | 708/300 |
| 2002/0078113 A1 | 6/2002 | Nakayama | 708/300 |
| 2002/0107899 A1 | 8/2002 | Masud et al. | 708/400 |

OTHER PUBLICATIONS

Daubechies et al., "Factoring Wavelet Transforms into Lifting Steps", J. Fourier Anal. Appl., vol. 4, Nr. 3, pp. 247-269, 1998.*

Li et al. "A Novel Design of Lifting Scheme from General Wavelet", IEEE Transaction on Signal Processing, vol. 49, No. 8 Aug. 2001.*

Kalker et al. "Ladder structure For Multidimensional Linear phase perfect reconstruction filter bank and wavelets", SPIE vol. 1818, 1992.*

Sweldens, Wim, "Lifting scheme: a new philosophy in biorthogonal wavelet contructions", Sep. 1995, Proc. SPIE vol. 2569, p. 68-79, Wavelet Applications in Signal and Image Processing III.*

Daubechies et al. (Factoring Wavelet Transform into Lifting Step, J. Fourier Anal. Appl., vol. 4, Nr. 3, pp. 247-269, 1998).*

Li et al. (A Novel Design of Lifting Scheme from General Wavelet, IEEE Transaction on Signal Processing, vol. 49, No. 8 Aug. 2001).*

Kalker et al. (Ladder structure For Multidimensional Linear phase perfect reconstruction filter bank and wavelets. SPIE vol. 1818, 1992).*

"The Lifting Scheme: A New Philosophy in Biorthogonal Wavelet Construction", W. Sweldens, Wavelet Applications in Signal and Image Processing III, proceedings of SPIE 2569, 1995, p. 69-79.

"Local decomposition of refinable spaces", J.M. Carnicer, W. Dahmen, and J.M. Pena, *Appl. Comput. Harm. Anal.*, vol. 3, pp. 127-153, 1996.

"Factoring wavelet transforms into lifting steps", I. Daubechies, W. Sweldens, *J. fourier Anal. Appl.*, vol. 4, No. 3, pp. 245-269, 1998.

"A VLSI Architecture for Lifting-Based Forward and Inverse Wavelet Transform," K. Andra, C. Chakrabarti, T. Acharya, *IEEE Trans. Of Signal Processing*, vol. 50, No. 40, pp. 966-977, Apr. 2002.

Acharya, T., and C. Chakrabarti, "A Survey on Lifting-Based Discrete Wavelet Transform Architectures," Journal of VLSI Signal Processing 42:321-339, 2006.

Vishwanath, M., "The Recursive Pyramid Algorithm for the Discrete Wavelet Transform," IEEE Transactions on Signal Processing 42(3):673-676, 1994.

* cited by examiner $$[A \quad B] = [x_{0,1} \quad x_{0,2}]\bar{P}(z)$$

$$= [x_{0,1} \quad x_{0,2}] \begin{bmatrix} 1 & \alpha \\ 0 & 1 \end{bmatrix} \begin{bmatrix} 1 & 0 \\ \beta + \gamma z^{-1} & 1 \end{bmatrix} \begin{bmatrix} 1 & \lambda z \\ 0 & 1 \end{bmatrix} \begin{bmatrix} \upsilon & 0 \\ 0 & \omega \end{bmatrix}$$

IMPLEMENTATION OF DISCRETE WAVELET TRANSFORM USING LIFTING STEPS

BACKGROUND OF THE INVENTION

The advantages of the wavelet transform over conventional transforms, such as the Fourier transform, are now well recognized. In many application areas, the wavelet transform is more efficient at representing signal features that are localized in both time and frequency. Over the past 15 years, wavelet analysis has become a standard technique in such diverse areas as geophysics, meteorology, audio signal processing, and image compression. Significantly, the 2-D biorthogonal discrete wavelet transform (DWT) has been adopted in the recently established the new JPEG-2000 still image compression standard.

The classical DWT can be calculated using an approach known as Mallat's tree algorithm. Here, the lower resolution wavelet coefficients of each DWT stage are calculated recursively according to the following equations:

$$c_{j-1,k} = \sum_{m} c_{j,m} \cdot h[m-2k] \quad (1)$$

$$d_{j-1,k} = \sum_{m} c_{j,m} \cdot g[m-2k] \quad (2)$$

where $c_{p,q}$ is the $q^{th}$ lowpass coefficient at the $p_{th}$ resolution,
$d_{p,q}$ is the $q^{th}$ highpass coefficient at the $p_{th}$ resolution,
h[] is the lowpass wavelet filter corresponding to the mother wavelet, and
g[] is the highpass wavelet filter corresponding to the mother wavelet, The corresponding tree structure for a two-level DWT is illustrated in FIG. 1. As shown in FIG. 1, the forward transform is computed using a series of high and low pass filters, denoted by g(−n) and h(−n), respectively, that operate on an input $c_j$ at increasing resolutions along the dimension of the sample index n. The decimated (i.e., down-sampled by a factor of two using decimators down, ↓2) output of the high pass filters at different stages ($d_{j-1}$, $d_{j-2}$, . . . ) captures the detail information at different resolutions. The decimated output of each low pass filter e.g. ($c_{j-1}$) is processed recursively by the low and high pass filters of the next stage to obtain $c_{j-2}$ and $d_{j-2}$. Finally, the decimated output of the low pass filter of the last stage corresponds to the low frequency content of the original signal at the lowest considered resolution. In Mallat's algorithm, the inverse transform is calculated using a reverse tree algorithm that repeatedly filters and interleaves the various streams of transform coefficients back into a single reconstructed data sequence.

The structure of the corresponding separable 2-D DWT algorithm is shown in FIG. 2, where G and H represents the lowpass and highpass subband filters, respectively. The input image is first decomposed horizontally; the resulting outputs are then decomposed vertically into four subbands usually denoted by LL, LH, HL, and HH. The LL subband can then be further decomposed in the same way.

In 1994, Sweldens proposed a more efficient way of constructing the biorthogonal wavelet bases, called the lifting scheme. Concurrently, similar ideas were also proposed by others. The basic structure of the lifting scheme is shown in FIG. 3. The input signal $S_{j,k}$ is first split into even and odd samples. The detail (i.e., high frequency) coefficients $d_{j-1,k}$ of the signal are then generated by subtracting the output of a prediction function P of the odd samples from the even samples. The smooth coefficients (the low frequency components) are produced by adding the odd samples to the output of an update function U of the details. The computation of either the detail or smooth coefficients is called a lifting step.

Daubechies and Sweldens showed that every FIR wavelet or filter bank can be factored into a cascade of lifting steps, that is, it can be represented as a finite product of upper and lower triangular matrices and a diagonal normalization matrix. The high-pass filter g(z) and low-pass filter h(z) in Equations 1 and 2 can thus be rewritten as:

$$g(z) = \sum_{i=0}^{J-1} g_i(z) \quad (3)$$

$$h(z) = \sum_{i=0}^{J-1} h_i(z) \quad (4)$$

where J is the filter length. We can split the high-pass and low-pass filters into even and odd parts:

$$g(z) = g_e(z^2) + z^{-1} g_o(z^2) \quad (5)$$

$$h(z) = h_e(z^2) + z^{-1} h_o(z^2) \quad (6)$$

The filters can also be expressed as a polyphase matrix as follows:

$$P(z) = \begin{bmatrix} h_e(z) & g_e(z) \\ h_o(z) & g_o(z) \end{bmatrix} \quad (7)$$

Using the Euclidean algorithm, which recursively finds the greatest common divisors of the even and odd parts of the original filters, the forward transform polyphase matrix P(z) can be factored into lifting steps as follows:

$$\tilde{P}(z) = \prod_{i=1}^{m} \begin{bmatrix} 1 & 0 \\ -s_i(z^{-1}) & 1 \end{bmatrix} \begin{bmatrix} 1 & -t_i(z^{-1}) \\ 0 & 1 \end{bmatrix} \begin{bmatrix} 1/K & 0 \\ 0 & K \end{bmatrix}, \quad m \leq K. \quad (8)$$

where $s_i(z)$ and $t_i(z)$ are Laurent polynomials corresponding to the update and prediction steps, respectively, and K is a non-zero constant. The inverse DWT is described by the following synthesis polyphase matrix:

$$P(z) = \prod_{i=1}^{m} \begin{bmatrix} 1 & s_i(z) \\ 0 & 1 \end{bmatrix} \begin{bmatrix} 1 & 0 \\ t_i(z) & 1 \end{bmatrix} \begin{bmatrix} K & 0 \\ 0 & 1/K \end{bmatrix} \quad (9)$$

As an example, the low-pass and high-pass filters corresponding to the Daubechies 4-tap wavelet can be expressed as:

$$\tilde{h}(z) = h_0 + h_1 z^{-1} + h_2 z^{-2} + h_3 z^{-3}$$
$$\tilde{g}(z) = -h_3 z^2 + h_2 z^1 - h_1 + h_0 z^{-1}, \quad (10)$$

where $$h_0 = \frac{1+\sqrt{3}}{4\sqrt{2}}, h_1 = \frac{3+\sqrt{3}}{4\sqrt{2}}, h_2 = \frac{3-\sqrt{3}}{4\sqrt{2}}, h_3 = \frac{1-\sqrt{3}}{4\sqrt{2}}$$

Following the above procedure, we can factor the analysis polyphase matrix of the Daubechies-4 wavelet filter as:

$$\tilde{P}(z) = \begin{bmatrix} 1 & -\sqrt{3} \\ 0 & 1 \end{bmatrix} \begin{bmatrix} 1 & 0 \\ \frac{\sqrt{3}}{4} + \frac{\sqrt{3}-2}{4}z^{-1} & 1 \end{bmatrix} \quad (11)$$

$$\begin{bmatrix} 1 & z \\ 0 & 1 \end{bmatrix} \begin{bmatrix} \frac{\sqrt{3}+1}{\sqrt{2}} & 0 \\ 0 & \left(\frac{\sqrt{3}+1}{\sqrt{2}}\right)^{-1} \end{bmatrix}$$

The corresponding synthesis polyphase matrix can be factored as:

$$P(z) = \begin{bmatrix} \left(\frac{\sqrt{3}+1}{\sqrt{2}}\right)^{-1} & 0 \\ 0 & \frac{\sqrt{3}+1}{\sqrt{2}} \end{bmatrix} \begin{bmatrix} 1 & -z \\ 0 & 1 \end{bmatrix} \quad (12)$$

$$\begin{bmatrix} 1 & 0 \\ -\frac{\sqrt{3}}{4} - \frac{\sqrt{3}-2}{4}z^{-1} & 1 \end{bmatrix} \begin{bmatrix} 1 & \sqrt{3} \\ 0 & 1 \end{bmatrix}$$

Similarly, the 9/7 analysis wavelet filter can be factored as:

$$\tilde{P}(z) = \begin{bmatrix} 1 & \alpha(1+z^{-1}) \\ 0 & 1 \end{bmatrix} \begin{bmatrix} 1 & 0 \\ \beta(1+z) & 1 \end{bmatrix} \begin{bmatrix} 1 & \gamma(1+z^{-1}) \\ 0 & 1 \end{bmatrix} \quad (13)$$

$$\begin{bmatrix} 1 & 0 \\ \delta(1+z) & 1 \end{bmatrix} \begin{bmatrix} \zeta & 0 \\ 0 & \zeta^{-1} \end{bmatrix}$$

The corresponding synthesis wavelet filter is factored as:

$$P(z) = \begin{bmatrix} \zeta^{-1} & 0 \\ 0 & \zeta \end{bmatrix} \begin{bmatrix} 1 & -\delta(1+z) \\ 0 & 1 \end{bmatrix} \begin{bmatrix} 1 & 0 \\ -\gamma(1+z^{-1}) & 1 \end{bmatrix} \quad (14)$$

$$\begin{bmatrix} 1 & -\beta(1+z) \\ 0 & 1 \end{bmatrix} \begin{bmatrix} 1 & 0 \\ -\alpha(1+z^{-1}) & 1 \end{bmatrix}$$

where the values of $\alpha$, $\beta$, $\gamma$, $\delta$, and $\zeta$ are shown in FIG. 8. The computational cost of calculating two Daub-4 DWT coefficients using Equation 11 is nine operations (five multiplications and four additions). On the other hand, Mallat's algorithm needs fourteen arithmetic operations (eight multiplications and six additions) according to Equation 10. In other words, the lifting steps provide 35% speed up for Daub-4 DWT calculation. For longer FIR wavelet filters, the speed up can be up to 50%, which is a significant improvement for real-time applications.

SUMMARY OF THE INVENTION

To calculate a DWT using a lifting algorithm, the input signal has to be first separated into even and odd samples. Each pair of input samples (one even and one odd) is then processed according to the specific analysis polyphase matrix. For many applications, the data can be read no faster than one input sample per clock cycle, so sample pairs are usually processed at every other clock cycle. Hence, this is a limitation on the speed and efficiency of a direct implementation of the lifting scheme. To overcome this bottleneck, there are proposed architectures in which data streams are interleaved within the DWT. Recursive architectures exploit the available idle cycles and re-use the same hardware to recursively interleave the DWT stages, and dual scan architectures achieve efficiency gain by keeping the datapath hardware busy with two different streams of data.

There is therefore provided in accordance with an aspect of the invention, an apparatus for digital signal processing, the apparatus comprising a cascade of digital filters connected to receive a sampled input signal and having an output, in which the digital filters implement a transform decomposed into lifting steps, the cascade of digital filters operating on pairs of samples from the sampled input signal. A source of a data stream is also provided, where the data stream is also composed of samples. A multiplexer multiplexes the samples of the data stream with the sampled input signal for processing by the cascade of digital filters.

In a further aspect of the invention, there is provided a method of transforming a sampled input signal into a transformed output signal, the method comprising the steps of:

operating on pairs of the sampled input signal with a cascade of digital filters that implements a transform decomposed into lifting steps to provide an output; and operating on samples from a data stream using the cascade of digital filters, where the samples from the data stream have been multiplexed with the sampled input signal.

In further aspects of the invention, the cascade of digital filters implements a one-dimensional discrete wavelet transform, such as a Daubechies-4 wavelet transform or 9/7 wavelet transform. The cascade of digital filters may implement filtering steps corresponding to Laurent polynomials. The cascade of digital filters may implement a two-dimensional transform that is decomposed into a first one-dimensional (row) transform followed by a second one-dimensional (column) transform. A buffer memory may be connected to receive samples from the data stream and output the samples to the cascade of digital filters for processing of the data stream by interleaving of the samples from the data stream with the sampled input signal. The data stream received by the buffer memory may be taken from the output of the cascade of digital filters to provide a recursive architecture. The cascade of digital filters may implement an N-dimensional transform, where N is greater than 2, and the number of digital filter cascades is N.

BRIEF DESCRIPTION OF DRAWINGS

There will now be described preferred embodiments of the invention with reference to the figures by way of illustration, without intending to limit the invention to the precise embodiments disclosed, in which:

FIG. 7c illustrates how the circuit of FIG. 7 implements equation 11;

Figure 1:
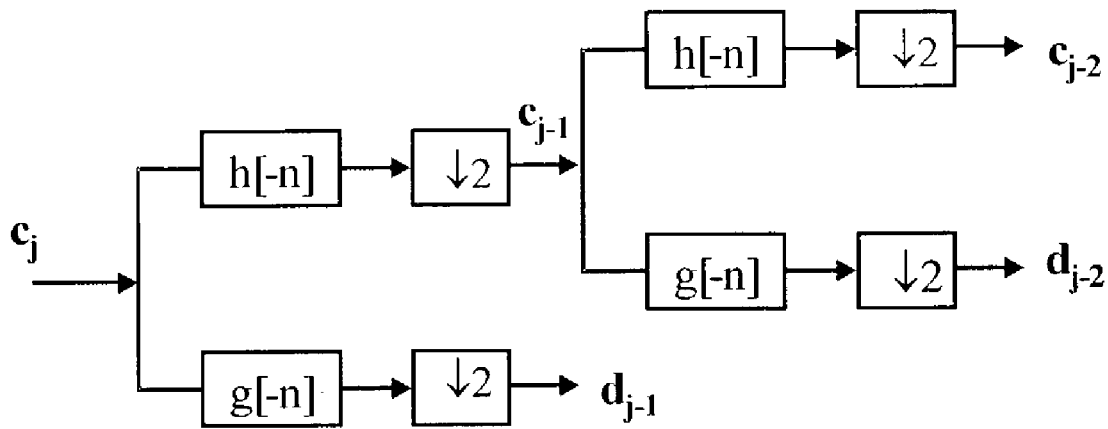
FIG. 1 is a block diagram of Mallat's tree algorithm.
Figure 2:
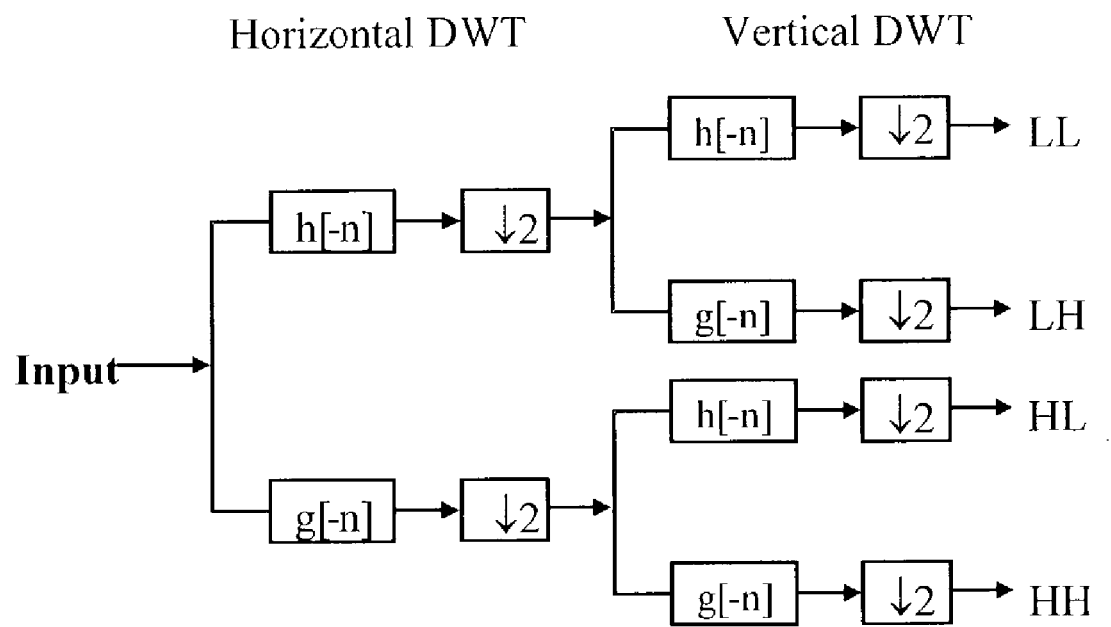
FIG. 2 is a block diagram of the 2-D separable DWT.
Figure 3:
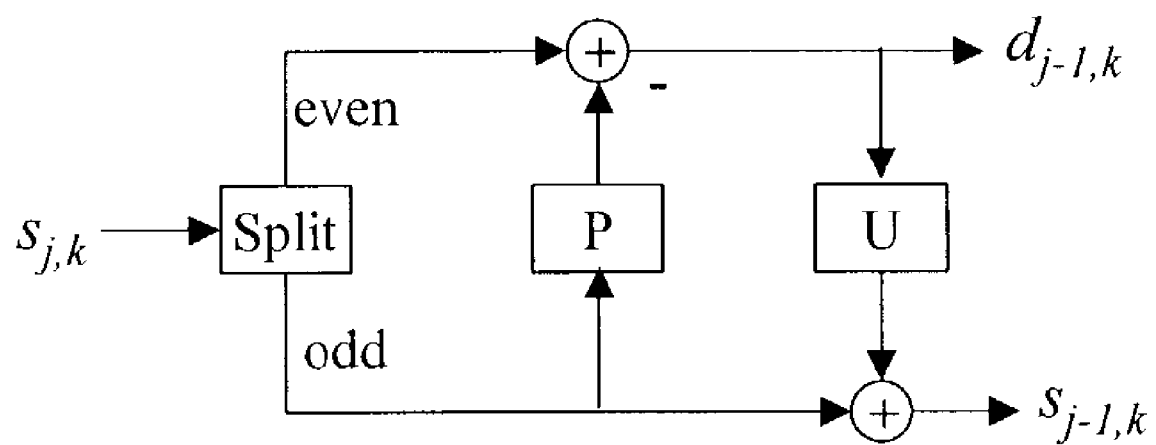
FIG. 3 depicts a general form of the lifting scheme.

This disclosure ends with Tables 1, 3, 5, 7, 9, 11, 13, 15, 17 and 19 that illustrate the manner of implementation of the recursive and dual scan architectures.

DETAILED DESCRIPTION OF PREFERRED EMBODIMENTS OF THE INVENTION

In the claims, the word "comprising" is used in its inclusive sense and does not exclude other elements being present. The use of the indefinite article "a" does not exclude more than one of the element being present.

As a preliminary matter, we consider a signal extension method for use in the proposed hardware architectures. To keep the number of wavelet coefficients the same as the number of data samples in the original signal, an appropriate signal extension method is necessary. Typical signal extension methods are zero padding, periodic extension, and symmetric extension. Zero padding is not normally acceptable for the classical wavelet algorithms due to the extra wavelet coefficients that are introduced. Periodic extension is applicable to all (biorthogonal and orthogonal) wavelet filters, but symmetric extension is suitable only for (symmetric) biorthogonal wavelet filters. Since the lifting scheme applies for constructing biorthogonal wavelets, symmetric extension can always be used for calculating the lifting scheme. Lifting steps obtained by factoring the finite wavelet filter pairs can be calculated by using simple zero padding extension. After a polyphase matrix representing a wavelet transform with finite filters is factored into lifting steps, each step becomes a Laurent polynomial, namely the $s_i(z)$ or $t_i(z)$ from Equation 8. Since the difference between the degrees of the even and odd parts of a polynomial is never greater than two, we can always find a common divisor of first-order or lower for the polynomials. Hence, a classical wavelet filter can always be factored into first-order or lower-order Laurent polynomials (i.e., $s_i(z)$ or $t_i(z)$). Lifting steps containing these short polynomials correspond to one to three-tap FIR filters in the hardware implementations. Because signal extension is not necessary for a two-tap wavelet filter, like for the Haar wavelet, zero padding can be used in the lifting algorithm.

In the preferred embodiment disclosed here, the easily implemented zero extension is used in the proposed architectures. The sample overlap wavelet transform recommended in JPEG-2000 Part II can also be implemented in the proposed 2-D architecture.

Because of the down-sampling resulting from the splitting step at each stage in the lifting-based DWT, the number of low frequency coefficients is always half the number of input samples from the preceding stage. Further, because only the low frequency DWT coefficients are further decomposed in the dyadic DWT, the total number of the samples to be processed for an L-stage 1-D DWT is:

$$N(1+\tfrac{1}{2}+\tfrac{1}{4}+\ldots+\tfrac{1}{2}^{L-1})=N(2-\tfrac{1}{2}^{L-1})<2N$$

where N is the number of the input samples. For a finite-length input signal, the number of input samples is always greater than the total number of intermediate low frequency coefficients to be processed at the second and higher stages. Accordingly, there are time slots available to interleave the calculation of the higher stage DWT coefficients while the first-stage coefficients are being calculated.

The recursive architecture (RA) is a general scheme that can be used to implement any wavelet filter that is decomposable into lifting steps. As 1-D examples, we describe RA implementations of the Daub-4 and 9/7 wavelet filters. The RA can be extended to 2-D wavelet filters, and can be extended to even higher dimensions by using the methods set forward in this disclosure.

Figure 4:
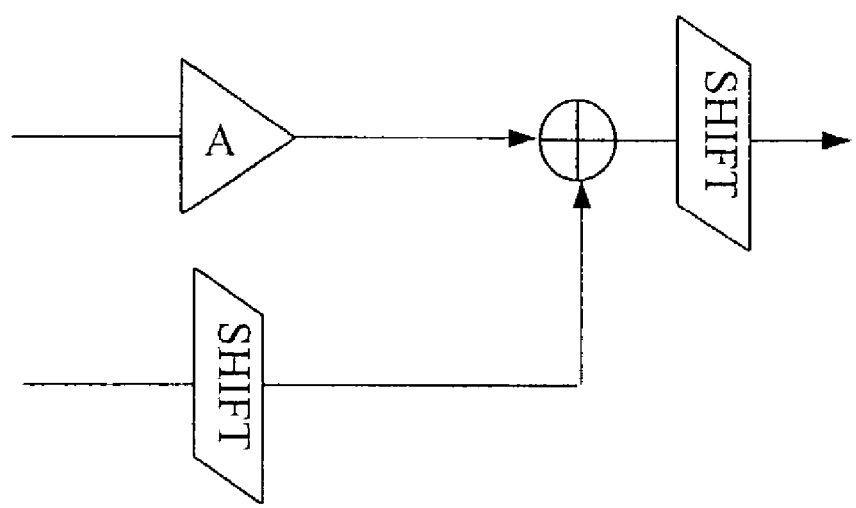
FIG. 4 depicts a MAC for asymmetric wavelet filters.
Figure 5:
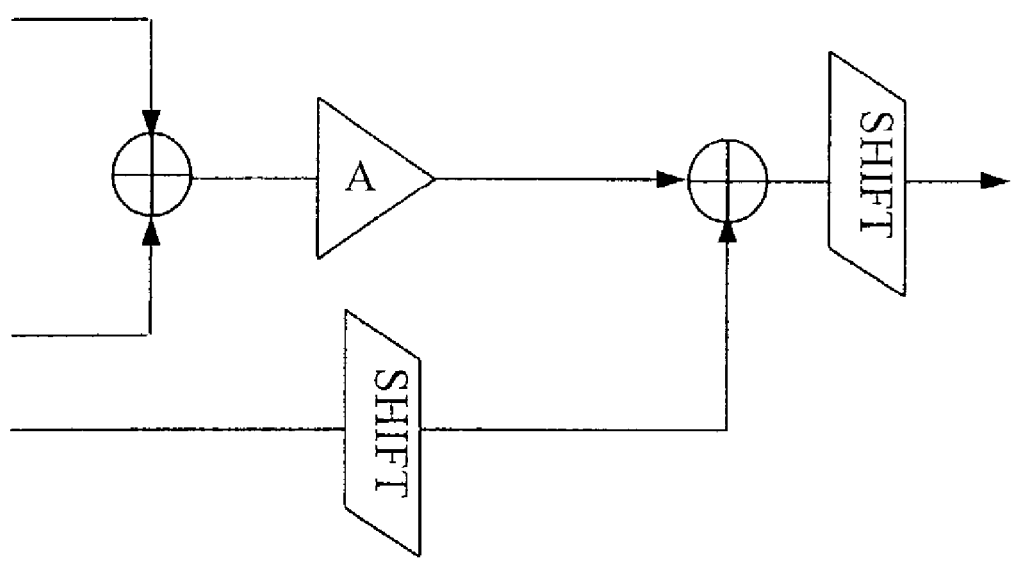
FIG. 5 depicts a MAC for symmetric wavelet filters.

The RA is a modular scheme made up of basic circuits such as delay units, pipeline registers, multiplier-accumulators (MACs), and multipliers. Since the factored Laurent polynomials $s_i(z)$ and $t_i(z)$ for symmetric (biorthogonal) wavelet filters are themselves symmetric, and those for asymmetric filters are normally asymmetric, we use two kinds of MACs to minimize the computational cost. The MAC for asymmetric filters, shown in FIG. 4, consists of a multiplier A, an adder ⊕, and two shifters labelled shift. The symmetric MAC, shown in FIG. 5, also has an amplifier A and two shifters, but it has one more adder ⊕ than the asymmetric MAC. The shifters are used to scale the partial results so that accuracy can be better preserved.

Figure 6:
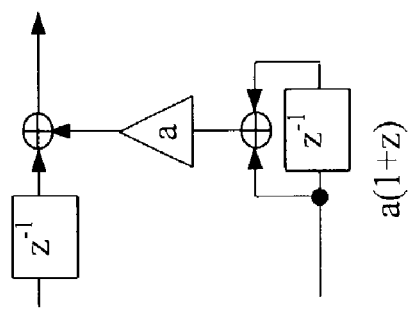
FIG. 6 depicts circuits for the basic lifting steps.
Figure 6:
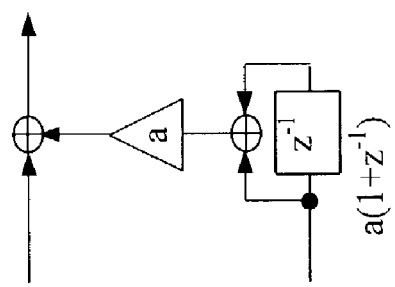
Figure 6:
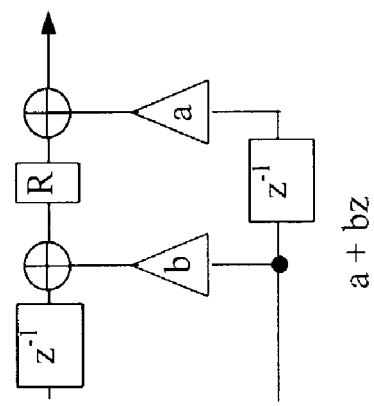
Figure 6:
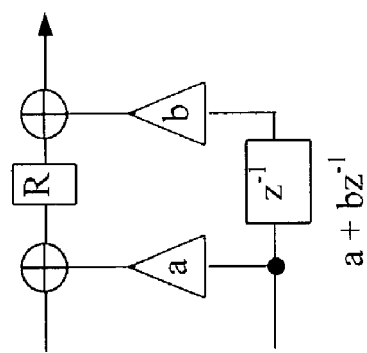

Different kinds of lifting-based DWT architectures can be constructed by combining the four basic lifting step circuits, shown in FIG. 6. These architectures are a combination of multipliers a and b, one or more shifters $z^{-1}$ where $z^{-1}$ relates to a delay of one sampling interval in the time domain, registers R, and adders ⊕. From left to right, these architectures perform respectively the following functions: $a+bz^{-1}$, $a+bz$, $a(1+z^{-1})$, $a(1+z)$. The general construction has the following steps:

Step 1: Decompose the given wavelet filter into lifting steps.

Step 2: Construct the corresponding cascade of lifting step circuits. Replace each delay unit in each circuit with an array of delay units. The number of delay units in the array is the same as the number of wavelet stages.

Step 3: At the beginning of the cascade, construct an array of delay units that will be used to split the inputs for all wavelet stages into even and odd samples. These delay units are also used to temporarily delay the samples so that they can be input into the lifting step cascade at the right time slot. Two multiplexer switches are used to select one even input and one odd input to be passed from the delay units to the first lifting step.

Step 4: Construct a data flow table that expresses how all of the switches are set and how the delay units are enabled in each time slot. There is latency as the initial inputs for the first wavelet stage propagate down through the cascade. A free time slot must then be selected to fix the time when the inputs for the second wavelet stage will be sent into the cascade. All higher order stages must also be scheduled into free time slots in the data flow table.

Step 5: Design the control sequencer to implement the data flow table.

Figure 7:
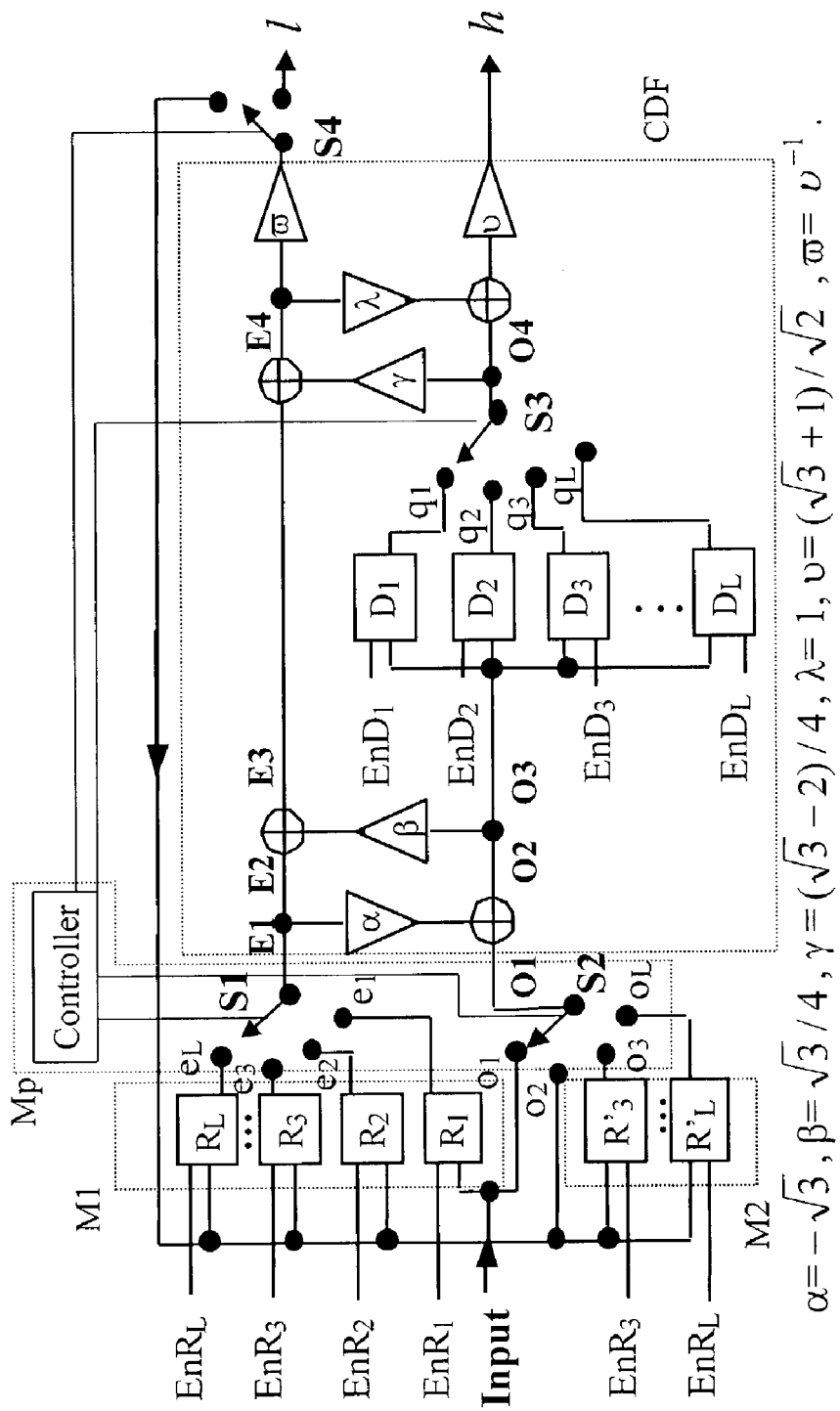
FIG. 7 is a 1-D recursive architecture for Daub-4 DWT.
Figure 7A:
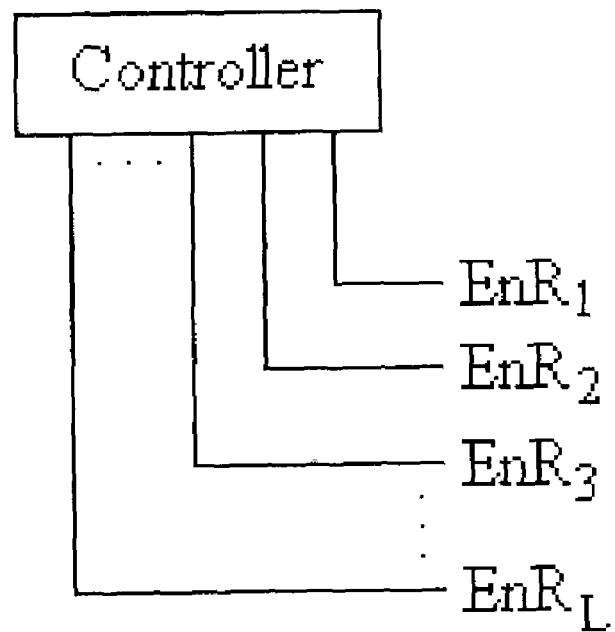
FIG. 7a depicts a controller emitting enabling signals to registers.
Figure 7B:
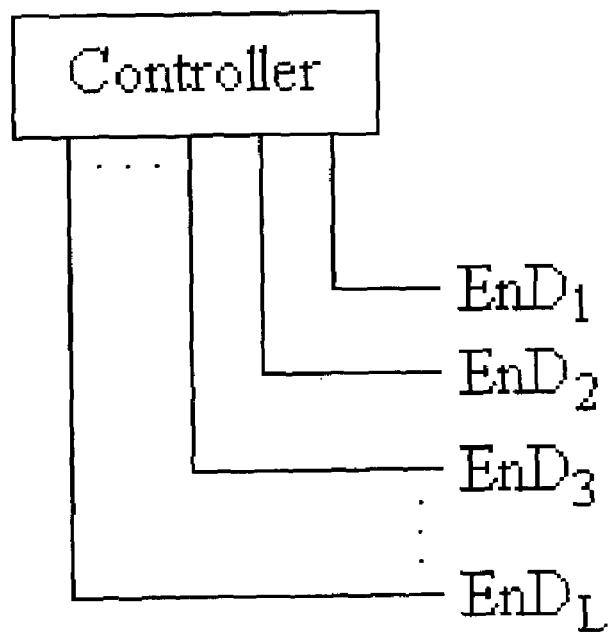
FIG. 7b depicts a controller emitting enabling signals to delay stages.
Figure 8:
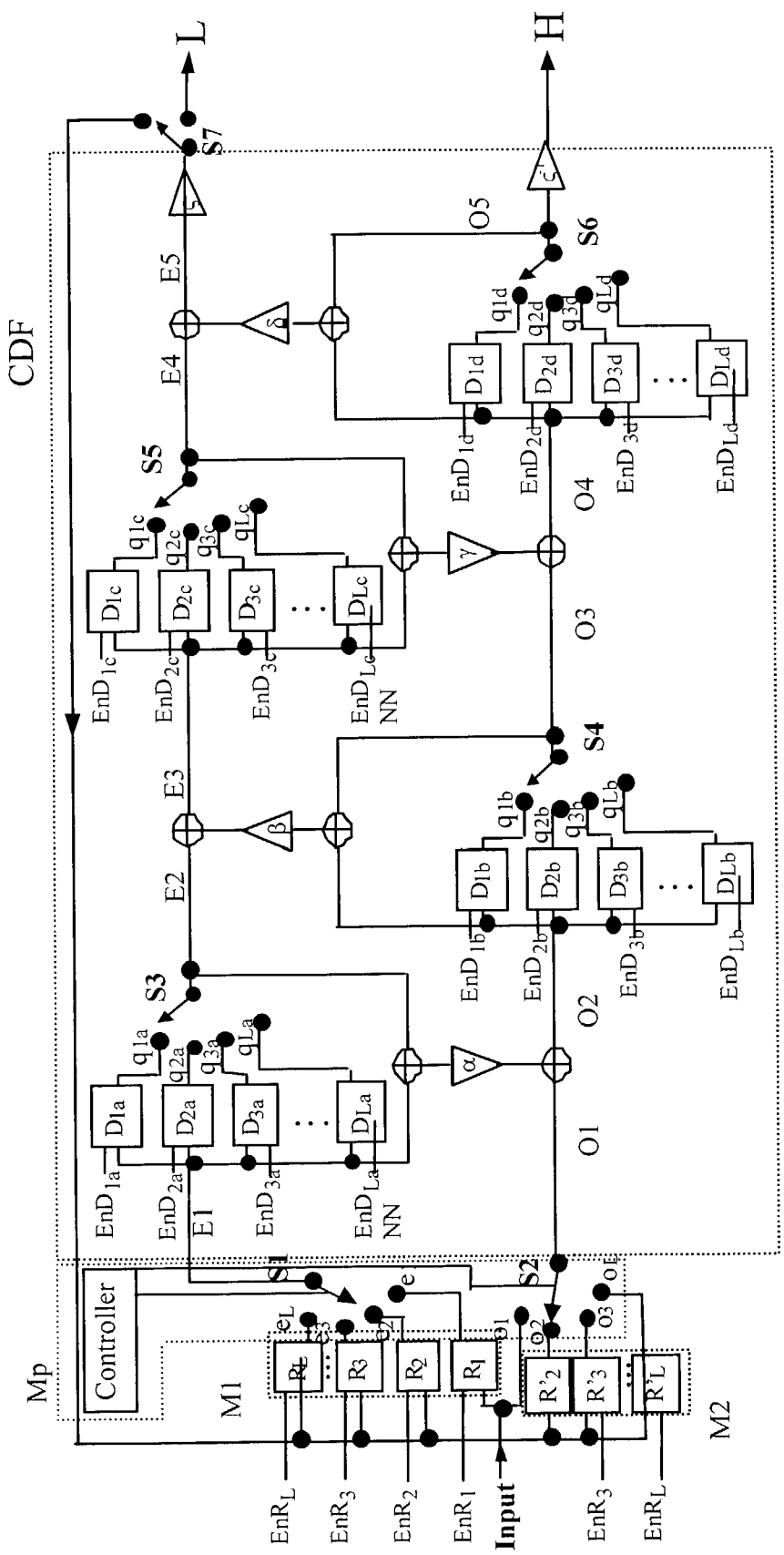
FIG. 8 is a 1-D recursive architecture for 9/7 DWT.

The RA in FIG. 7 calculates the Daub-4 DWT, while the RA in FIG. 8 calculates the 9/7 DWT. In both figures, elements labelled $R_i$ or $R'_i$ refer to registers, $D_i$ refers to delay units, where i represents the stage and is an integer from 1 to L with L representing the last stage which would be 4 for a three stage DWT since the input signal has i=1 and relates to stage 0. $S_i$ refers to the various switches, where i is an integer from 1 to 4 in FIG. 7, and from 1 to 7 in FIG. 8. The enabling signals for the registers $EnR_i$ originate from the controller as shown in FIG. 7a. Similarily, the enabling signals for the delay stages $EnD_i$ originate from the controller as shown in 7b. The controller is, connected to all enabling signals as described and switches, however connections to switches S3 to S7 have been omitted for clarity. The enable signals and switch positions can be determined at any particular time from tables 2 and 3 respectively for a three stage DWT. The values $e_i$ and $o_i$ represent the even and odd values of the input signals, $q_i$ represents the input values from the delay stages into the lifting scheme, and $E_i$ and $O_i$ represent the intermediate values of the CDF in FIGS. 7 and 8.

Figure 10:
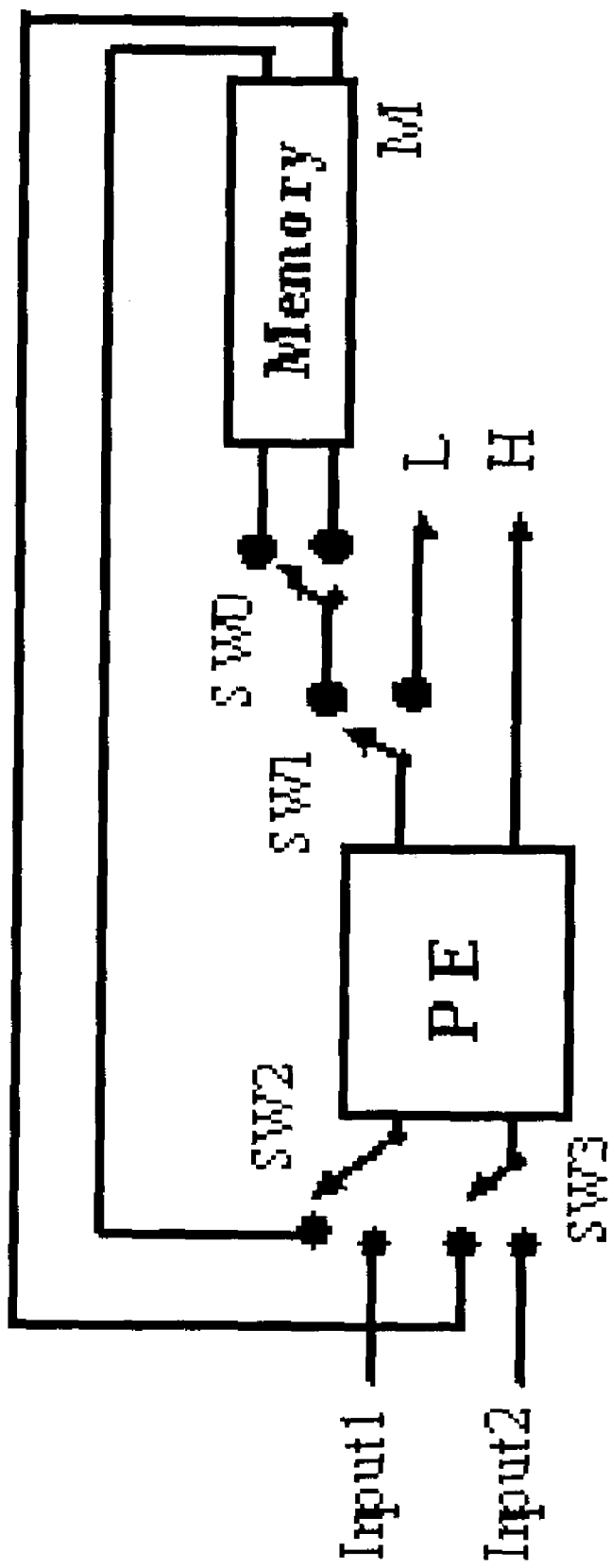
FIG. 10 depicts a 1-D dual scan architecture.
Figure 10A:
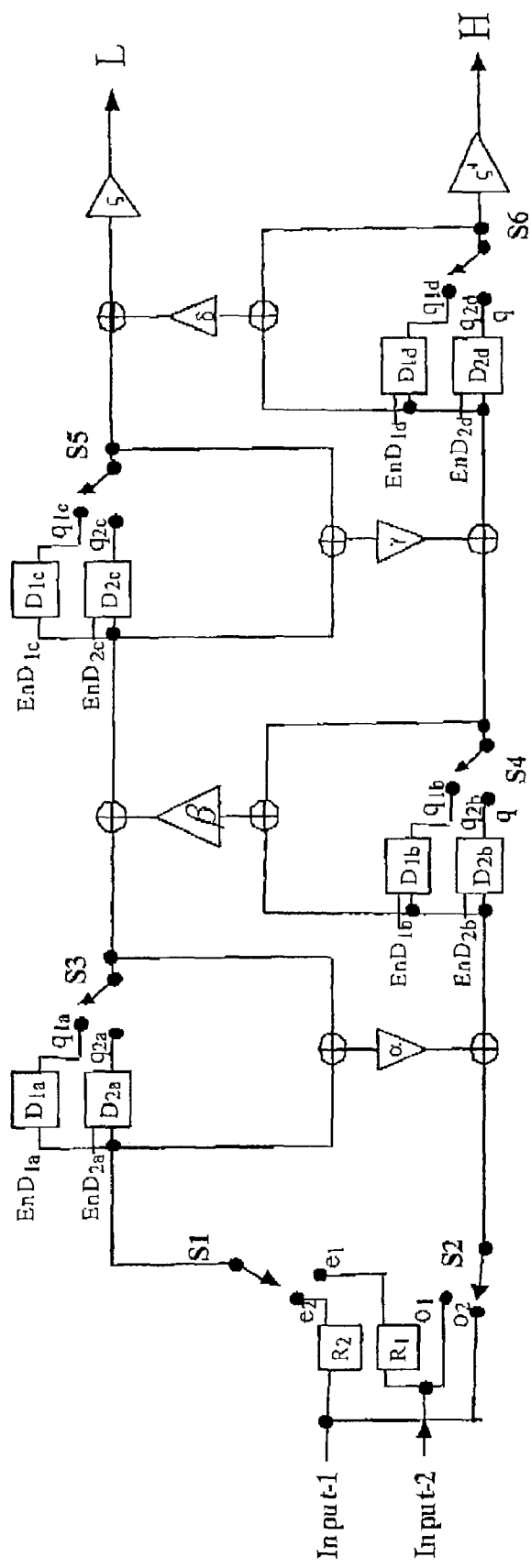
FIG. 10a shows detail of the architecture of the block PE in FIG. 10.

In the proposed lifting scheme, a cascade of digital filters CDF (FIG. 7, FIG. 8) are connected to receive a sampled input signal Input and have an output 1, h (FIG. 7), L,H (FIG. 8, FIG. 10). The cascade of digital filters CDF implement a DWT decomposed into lifting steps of the type shown in FIG. 6 and is dependent upon the DWT being used. A buffer memory formed of memory blocks M1, M2 (FIG. 7, FIG. 8), each of which is made of a number of registers $R_i$, is connected to receive samples from a data stream, and the values are assigned according to the enable signals $EnR_i$. In FIG. 10a, $R_1$ and $R_2$ form a memory that together with switches S1 and S2 provide multiplexing of two data streams together for processing by the cascade of digital filters CDR. As for example in the case of the dual stream architecture of FIG. 10, the sampled input signal and the data stream (a second sampled input signal) may be left and right channels of a stereo signal, or in the case of the recursive architecture of FIGS. 7 and 8 the data stream may be taken from the output of the cascade of digital filters. The buffer memory M1, M2 is connected to output the received samples into the cascade of digital filters CDF. A multiplexer Mp (FIGS. 7, 8) consisting of switches S1, S2 (FIGS. 7, 8) and a controller is provided for multiplexing the sampled input signal Input with the sampled signal stored in the memory buffer as the input to the cascade of digital filters (CDA) according to the procedures described below. In the case of the dual stream architecture of FIG. 10, the inputs 1 and 2 are multiplexed together by the multiplexer formed by switches S1 and S2 and their associated controller (not shown) for processing by the cascade of digital filters PC.

In FIG. 7, the input registers $R_i$ (i=1,2, . . . , L) and $R'_i$ (i=3, . . . , L) hold the input values for the $(i-1)^{th}$ DWT stage. Thus the first stage coefficients can be calculated at every other clock cycle and the data for the other stages can be fed into the lifting step pipeline during the intervening cycles. Using $x_{i,j}$ to denote the $j^{th}$ coefficient of the $i^{th}$ stage, the DWT coefficients can be calculated in the order shown in FIG. 9. The CDA is implemented according to equation 12 and using the circuits for the lifting steps shown in FIG. 6 to perform the necessary operations, where the $z^{-1}$ has been replaced with the delay stages $D_i$.

The input registers $R_i$ also synchronize the even and odd samples of each stage. Since the first two stages can be immediately processed when the odd samples are ready, no input register is needed for the odd samples for these two stages. Register $D_i$ is a delay unit for the $i^{th}$ stage. After splitting the input data into even and odd parts, the Daub-4 DWT is calculated step by step as shown in Table 1. In Table 1, $E_n$ and $O_n$ are the outputs of each lifting step; $e_{-i,j}$ and $o_{-i,j}$ denote the even and odd intermediate results of each lifting step. Since the architecture is pipelined by each MAC unit, the outputs of each lifting step are synchronized. As an example, the calculations of the first pair of DWT coefficients are given below:

E1: $x_{0,1} = x_{0,1}$

O1: $x_{0,2} = x_{0,2}$

E2: $e_{-1,1} = x_{0,1}$

O2: $o_{-1,1} = \alpha x_{0,1} + x_{0,2}$

E3: $e_{-1,1} = \beta o_{-1,1} + e_{-1,1}$

O3: $o_{-1,1} = o_{-1,1}$

E4: $e_{-1,1} = z^{-1}\gamma o_{-1,1} + e_{-1,1}$

O4: $o_{-1,1} = z^{-1} o_{-1,1}$

Low frequency DWT coefficient l: $l_{-1,1} = \upsilon . e_{-1,1}$

High frequency DWT coefficient h: $h_{-1,1} = \omega(\lambda e_{-1,1} + o_{-1,1})$.

Therefore, the DWT coefficients of the first stage are generated five clock cycles after the first input sample is received. The first low frequency DWT coefficient $l_{-1,1}$ is also stored in register $R_2$. After the second low frequency DWT coefficient $l_{-1,2}$ is ready, $l_{-1,1}$ and $l_{-1,2}$ are further processed in the idle cycles, as shown in Table 1. The outputs at various stages of lifting steps corresponding to Daub-4 wavelet are shown in FIG. 7c. The analysis polyphase matrix has four factors. $[A_{p+1}, B_{p+1}]$ represents the output after p-th matrix multiplication. $\alpha, \beta, \gamma, \lambda, \upsilon, \omega$ are as defined in FIG. 7. The relationship between the output at each clock cycle and the output of various lifting factors is as follows:

Matrix-1

$$[A_1 B_1] = [x_{0,1} x_{0,2}][E_1 O_1]$$

Matrix-(1 + 2)

$$[A_2 \ B_2] = [A_1 \ B_1]\begin{bmatrix} 1 & \alpha \\ 0 & 1 \end{bmatrix} = [E_1 \ O_1]\begin{bmatrix} 1 & \alpha \\ 0 & 1 \end{bmatrix}$$
$$= [E_1 \ E_1\alpha + O_1] = [x_{0,1} \ \alpha x_{0,1} + x_{0,2}] = [E_2 \ O_2]$$

Matrix-(1 + 2 + 3)

$$[A_3 \ B_3] = [A_2 \ B_2]\begin{bmatrix} 1 & 0 \\ \beta + \gamma z^{-1} & 1 \end{bmatrix} = [A_2 + B_2(\beta + \gamma z^{-1}), \ B_2]$$
$$= [E_2 + O_2(\beta + \gamma z^{-1}), \ O_2] = [E_3 + O_3 \cdot \gamma z^{-1}, \ O_3]$$

Matrix-(1 + 2 + 3 + 4)

$$[A_4 \ B_4] = [A_3 \ B_3]\begin{bmatrix} 1 & \lambda z \\ 0 & 1 \end{bmatrix} = [E_3 + O_3\gamma z^{-1}, \ O_3]\begin{bmatrix} 1 & \lambda z \\ 0 & 1 \end{bmatrix}$$
$$= [E_3 + O_3\gamma z^{-1}, \lambda(E_3 z + O_2\gamma) + O_3]$$
$$= [E_4, (\lambda E_4 + O_4)z]$$

Matrix·(1 + 2 + 3 + 4 + 5)

$$[A \ B] = [A_4, \ B_4]\begin{bmatrix} \upsilon & 0 \\ 0 & \omega \end{bmatrix} = [E_4, (\lambda E_4 + O_4)z]\begin{bmatrix} \upsilon & 0 \\ 0 & \omega \end{bmatrix}$$

$$= [\upsilon E_4, \omega(\lambda E_4 + O_4)z]$$

The $[E_p, O_p]$ denotes the output at p-th clock cycle. $[A_p, B_p]$s are as defined in FIG. 7c.

The control signals for the switches in a RA can also be deduced from the corresponding data flow table (which is Table I in this case). The timing for the register enable signals is shown in Table 3. Switches S1, S2 and S3 steer the data flows at each stage. The timing of the switch control signals is shown in Table 5. Output switch S4 feeds back the low frequency DWT coefficients (except for the last stage) to be further decomposed. The switching timing for S4 is the same as for S1.

FIG. 8 stores the data in registers in a manner similar to that described for FIG. 7. The multiplexer Mp inputs the odd and even values as pairs into the cascade of digital filters. The delay registers $D_{ia}$, $D_{ib}$, $D_{ic}$, and $D_{id}$ ensure that the values are inputted as pairs into the next set of filters, where i relates to the stage of the DWT. Switch S7 feeds back the low frequency DWT coefficients except for during the last stage when the coefficient is outputted at L. The intermediate stages are implementing according to equation 14 and using the corresponding circuits shown in FIG. 6 to perform the necessary operations, where the $z^{-1}$ has been replaced with the delay stages $D_i$.

The calculations of the first pair of DWT coefficients for Daubechies 9/7 wavelet are given below:

$E_1 = x_{0,1} = x_{0,1}$ $O_1 = x_{0,2} = x_{0,2}$ $E_2 = e_{-1,1} = z^{-1} \cdot x_{0,1}$ $O_2 = o_{-1,1} = \alpha(\phi + x_{0,1}) + x_{0,2} O_{-1,2} = \alpha(x_{0,1} + x_{0,3}) + x_{0,4}$ $E_3 = e_{-1,1} = \beta(o_{-1,1} + o_{-1,2}) + e_{-1,1}$ $O_3 = o_{-1,1} = z^{-1} \cdot o_{-1,1}$ $O_4 = o_{-1,1} = \gamma(e_{-1,1} + e_{-1,2}) + o_{-1,1}$ $E_4 = e_{-1,1} = z^{-1} \cdot e_{-1,1}$ $E_5 = e_{-1,1} = \gamma(o_{-1,1} + z^{-1} o_{-1,2}) + e_{-1,1}$ $O_5 = o_{-1,1} = z^{-1} \cdot o_{-1,1}$ Low frequency DWT coefficient $L = l = \zeta \cdot e_{-1,1}$ High frequency DWT coefficient $H = h = \zeta^{-1} \cdot o_{-1,1}$ The design of the controller is relatively simple, due to the regularity of the control signals for the RA, as shown in Table 3 and Table 5. All control signals are generated by counters and flip-flops controlled by a four-state finite state machine. The counters generate periodic signals for the longer period (T>4 clock cycles) control signals, and the flip-flops produce local delays. If externally-generated start and stop signals are provided, the long counter for keeping track of the number of input samples is unnecessary. Compared to other direct implementations of lifting-based DWTs, the overhead for the RA controller is very small. The controller should occupy less than 10% of the total silicon area of the 1-D RA.

The remaining elements of the RA include registers and switches (tri-state buffers). Since the area of the switches is negligible compared to the size of the whole architecture, the cost of the registers dominates. For implementing an L-stage DWT, the RA uses (L−1)(M+1) more registers than a conventional lifting-based architecture, where M is the number of delay registers. Considering that a conventional architecture needs an extra memory bank to store at least N/2 intermediate DWT coefficients, the RA architecture is more area-efficient in most applications, where (L−1)(M+1)<<N/2. The power consumption of the RA should be lower than that of a conventional architecture because the RA eliminates the memory read/write operations and because all data routing is local. By avoiding the fetching of data from memories and the driving of long wires, the power dissipated by the RA switches is small.

Figure 9:
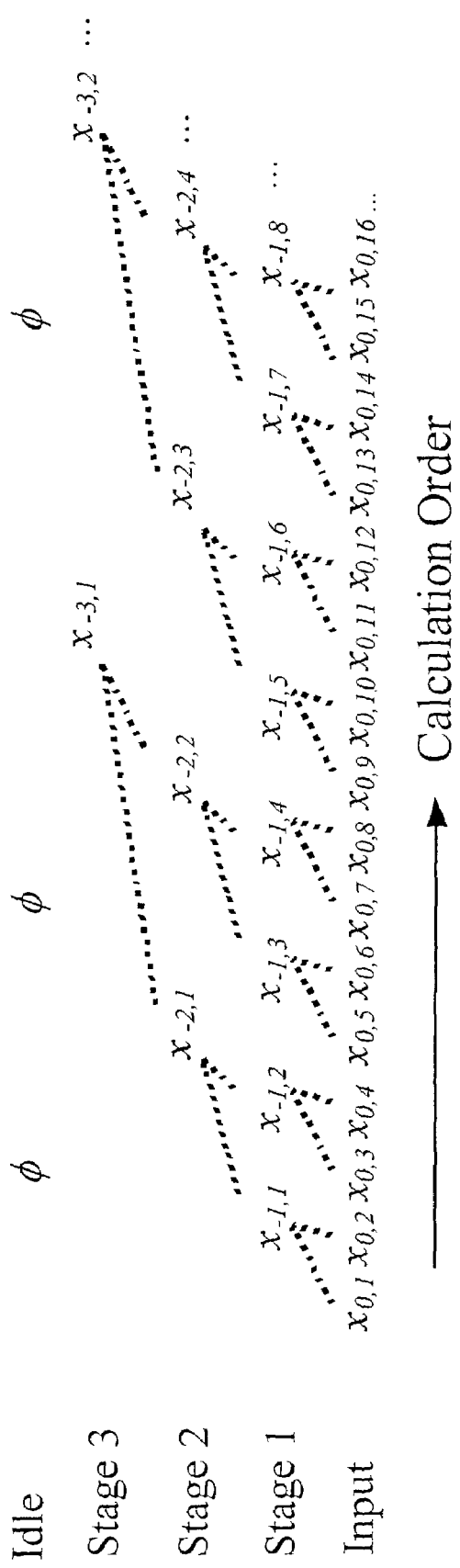
FIG. 9 is a 1-D DWT coefficient computation order.

In FIG. 9 the coefficient computation order is shown with the input at the bottom and computed coefficients in the levels above, and where $\phi$ is used to denote an idle clock cycle where no coefficient is calculated. Since the pipeline delay for calculating an L-stage DWT is $L \times T_d$ (where $T_d$ is the latency from input to output) and the sampling-interval for each stage computation increases by two cycles for each additional stage, shown in FIG. 9, the clock cycle count $T_P$ for processing an N-sample DWT can be expressed as:

$$T_P = N + (L \times T_d) + (1 + 2 + \ldots + 2^{L-2}) = N + L \times T_d + 2^{L-1} - 1.$$

The hardware utilization can be defined as the ratio of the actual computation time to the total processing time, with time expressed in numbers of clock cycles. At each section of the pipeline structure, the actual clock cycle count $T_C$ is the number of sample pairs to be processed.

$$T_C = (N + N(1 - 2^{1-L}))/2.$$

Note that $N(1-2^{1-L})$ is the number of samples being processed at the second or higher stages. The busy time $T_B$ of the corresponding section can be expressed as:

$$T_B = T_P - T_d = N + (L-1) \times T_d + 2^{L-1} - 1.$$

Consequently, the hardware utilization U of the L-stage RA is:

$$U = T_C/T_B \times 100\% = \frac{N + N(1 - 2^{1-L})}{2(N + 2^{L-1} + (L-1) \times T_d - 1)} \times 100\% \quad (15)$$

Because U is a continuous concave function of variable L when $L \geq 1$, the maximum hardware utilization can be achieved when $\partial U/\partial L = 0$. Ignoring the delay $T_d$, $\partial U/\partial L = 0$ can be expressed as:

$$\frac{\partial U}{\partial L} = \frac{N(L-1)2^{-L} - L2^{L-1}}{2(N + 2^{L-1} - 1)^2} = 0.$$

The above equation is true when $L = 2^{-1}(\log_2 N + \log_2(1-1/L) + 1)$. Assuming L>1 and N>>$\sqrt{N}$, the utilization reaches a maximum of about 90% when $L = 0.5 \log_2 N$, and gradually reduces to around 50% when L=1 or $\log_2 N$. For a 5-stage DWT operating on 1024 input samples, the utilization approaches 92%. When the number of decomposition stages L increases, the processing time increases significantly and the utilization drops accordingly. As mentioned above, the delay of $2^L$ was due to the increasing separation ($2^L$ clock cycles) of the input values to each stage. If we decrease the sampling grid for each stage as soon as all previous stages have finished, we can speed up the computation. With a little bit additional controller overheads, the processing time in clock cycle of an L-stage DWT can be reduced to:

$$N+(L \times T_d).$$

When $N \rightarrow \infty$, the hardware utilization of the 1-D RA approaches 100%. Compared to the conventional implementations of the lifting algorithm, the proposed architectures can achieve a speed-up of up to almost 100% as shown in Table 7.

To achieve higher hardware utilization for special cases, we also propose the dual scan architecture (DSA), which interleaves the processing of two independent signals simultaneously to increase the hardware utilization. The 1-D DSA is shown in FIG. 10. The input signals Input1 and Input2 are two different data streams. These streams are multiplexed as shown in FIG. 10a into the processing element PE that is a conventional direct hardware implementation of the lifting scheme constructed from the basic building block circuits as discussed previously. The input switches SW2 and SW3 are connected to one of the two input pairs of odd and even components when processing the first stage, and are connected to the memory M when processing the other stages, where the two connections from the memory correspond to the coefficients calculated from Input1 and Input2. Switch SW0 separates the low frequency coefficients of the two input signals. Because the architecture generates one low frequency coefficient at each clock cycle, SW0 is controlled by the system clock. The output switch SW1 is connected to the output L only at the final stage, while coefficients are outputted to H at every stage. The size of the memory unit is M/2, where M is the maximum number of input samples.

The 1-D DSA calculates the DWT as the input samples are being shifted in, and stores the low frequency coefficients in the internal memory. When all input samples have been processed, the stored coefficients are retrieved to start computing the next stage. The input switches SW2, SW3 in FIG. 10 separate two independent dataflow, while the input switches S1, S2 inside the PE split the even and odd samples. The processes of different transform levels are not interleaved in the dual scan architecture, because there is no idle clock cycle for doing that, and that is why there is a buffer for storing the intermediate coefficients. In other words, the sequence of operation of the 1-D DSA is as follows:

1. In one clock cycle, the first pair of odd and even samples e1, o1 from input-1 comes in, and the DWT calculation for input-1 starts. Switches S1 and S2 select e1 and o1. The even sample is delayed in $R_2$.
2. In the second clock cycle, the first pair of odd and even samples e2, o2 from input-2 comes in, and the DWT calculation for input-2 starts. Switches S1 and S2 select e2 and o2. The even sample is delayed in $R_1$.
3. Steps 1 and 2 are repeated for other pairs of input samples.
4. 5 cycles after the PE starts operations, the lowpass and highpass coefficients will be produced at the output. The PE implements lifting steps of the type shown in FIG. 6, using adders $\oplus$, delay elements Di enabled through EnDi and associated switches S3, S4, S5 and S6, and scalers $\alpha$, $\beta$, $\delta$, $\epsilon$ whose values are indicated in FIG. 10a. The output from PE is scaled by scalers $\zeta$ and $\zeta^{-1}$.
5. The DWT coefficients for input-1 and input-2 will be outputted at alternate clock-cycles. The lowpass coefficients are stored in the memory buffer M.
6. The intermediate coefficients corresponding to input-1 and input-2 are present in different parts of the circuit, and hence do not conflict.
7. After the first level of decomposition is complete for input-1 and input-2, there will not be any new input. Now the first level lowpass DWT coefficients that are stored in the memory buffer M are fedback and used as the input of the PE.
8. Steps 1-4 are repeated with two streams of inputs corresponding to input-1 and input-2.
9. The $2^{nd}$ stage DWT coefficients for input-1 and input-2 will be outputted at alternate clock-cycles. The lowpass coefficients are again stored in the memory buffer M.
10. After the second first level of decomposition is complete for input-1 and input-2, there will not be any new input. Now the second level lowpass DWT coefficients that are stored in the memory buffer are fedback and used as the input of the PE.
11. Further decomposition can be carried out using the same procedure.

As the 1-D DSA performs useful calculations in every clock cycle, the hardware utilization for the PE is 100%. The processing time for the L-stage DWT of two N-sample signals is $N+L \times T_d$. Compared to conventional implementations for computing two separate signals, the 1-D DSA requires only half the hardware. Hence, given an even number of equal-length signals to process, the speedup of the 1-D DSA is 100%. A recursive architecture RA will calculate a DWT in about half the time compared to DSA. It starts calculating higher-level DWT coefficients even before it completes the first level decomposition. On the other hand, a DSA calculates a DWT for two streams stage-by-stage. The total computation time is double that of the RA. However, because it calculates DWT of two arrays, on average it has hardware utilization efficiency similar to that RA.

Figure 11:
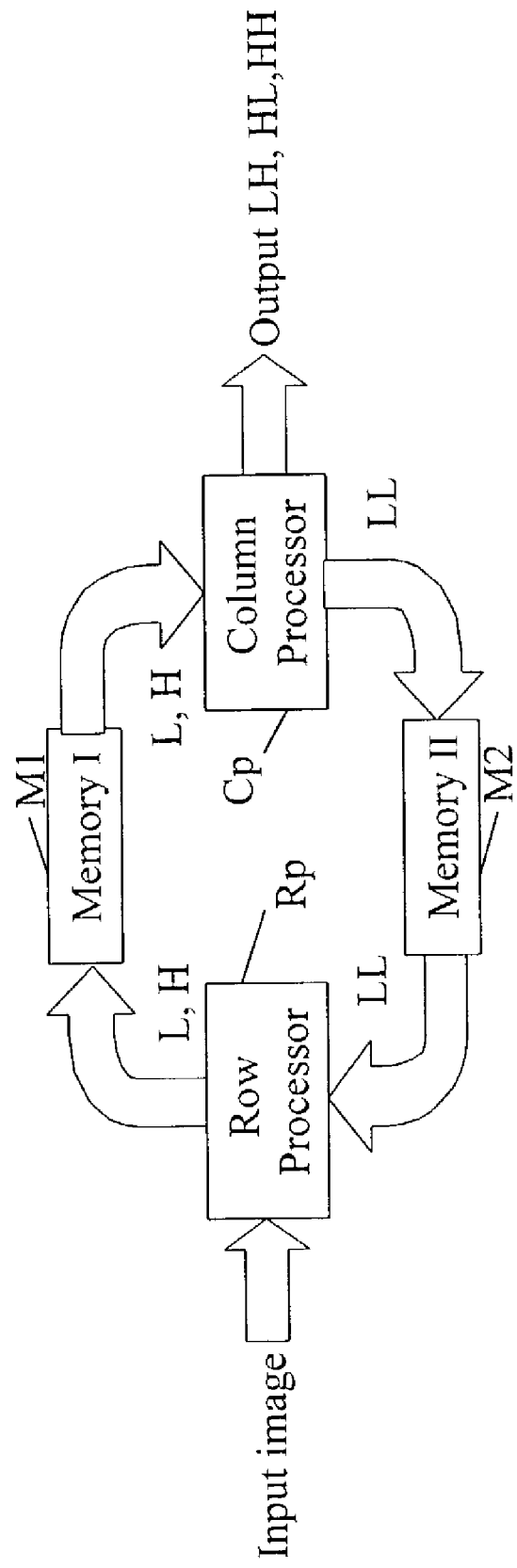
FIG. 11 depicts a conventional 2-D lifting architecture.

A conventional implementation of a separable 2-D lifting-based DWT is illustrated in FIG. 11, where separate row and column processors, Rp and Cp respectively, each use a 1-D lifting architecture. The row processor calculates the DWT of each row of the input image, and the resulting decomposed low and high frequency components, L and H respectively, are stored in memory bank M1. Since this bank normally stores all the horizontal DWT coefficients, its size is $N^2$ for an N×N image. When the row DWT is completed, the column processor Cp starts calculating the vertical DWT on the coefficients from the horizontally decomposed image. The LH, HL, and HH subbands are final results and can be shifted out; the LL subband is stored in memory bank M2 for further decomposition. The size of memory bank M2 is thus at least $N^2/4$. Such a straightforward implementation of the 2-D DWT is both time and memory-intensive. To increase the computation speed, we propose a 2-D RA and a 2-D DSA for the separable 2-D lifting-based DWT.

Figure 12:
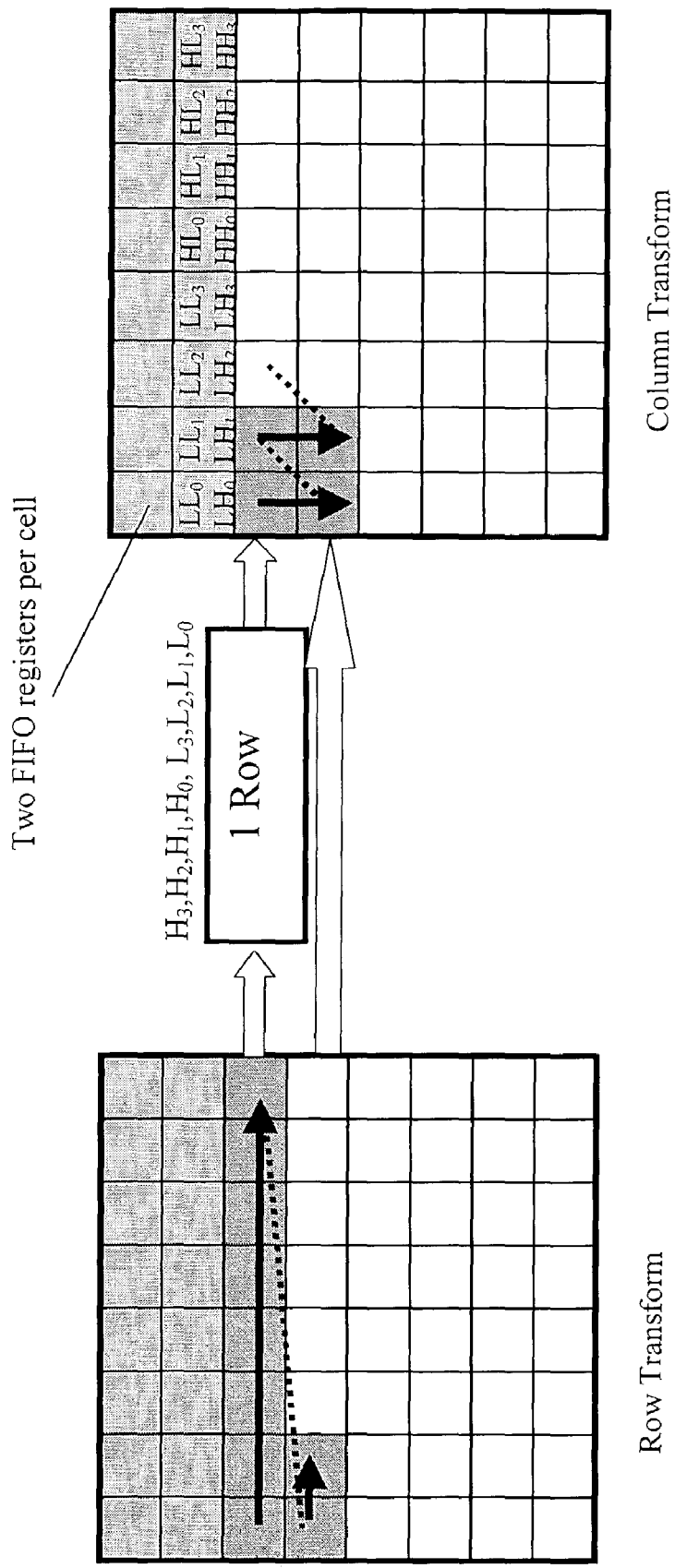
FIG. 12 shows the calculation sequence for a 2-D recursive architecture.

The basic strategy of the 2-D recursive architecture is the same as that of its 1-D counterpart: the calculations of all DWT stages are interleaved to increase the hardware utilization. Within each DWT stage, we use the processing sequence shown in FIG. 12. The image is scanned into the row processor in a raster format, and the first horizontal DWT is immediately started. The resulting high and low frequency DWT coefficients $H_i$, $L_i$ of the odd lines are collected and pushed into two FIFO (first in first out) registers or two memory banks. The separate storage of the high and low frequency components $H_i$, $L_i$ produces a more regular data flow and reduces the required output switch operations, which in turn consumes less power. The DWT coefficients of the even lines are also rearranged into the same sequence, and are directly sent to the column processor together with the outputs of the FIFO. The column processor starts calculating the vertical DWT in a zigzag format after one row's delay.

Figure 13:
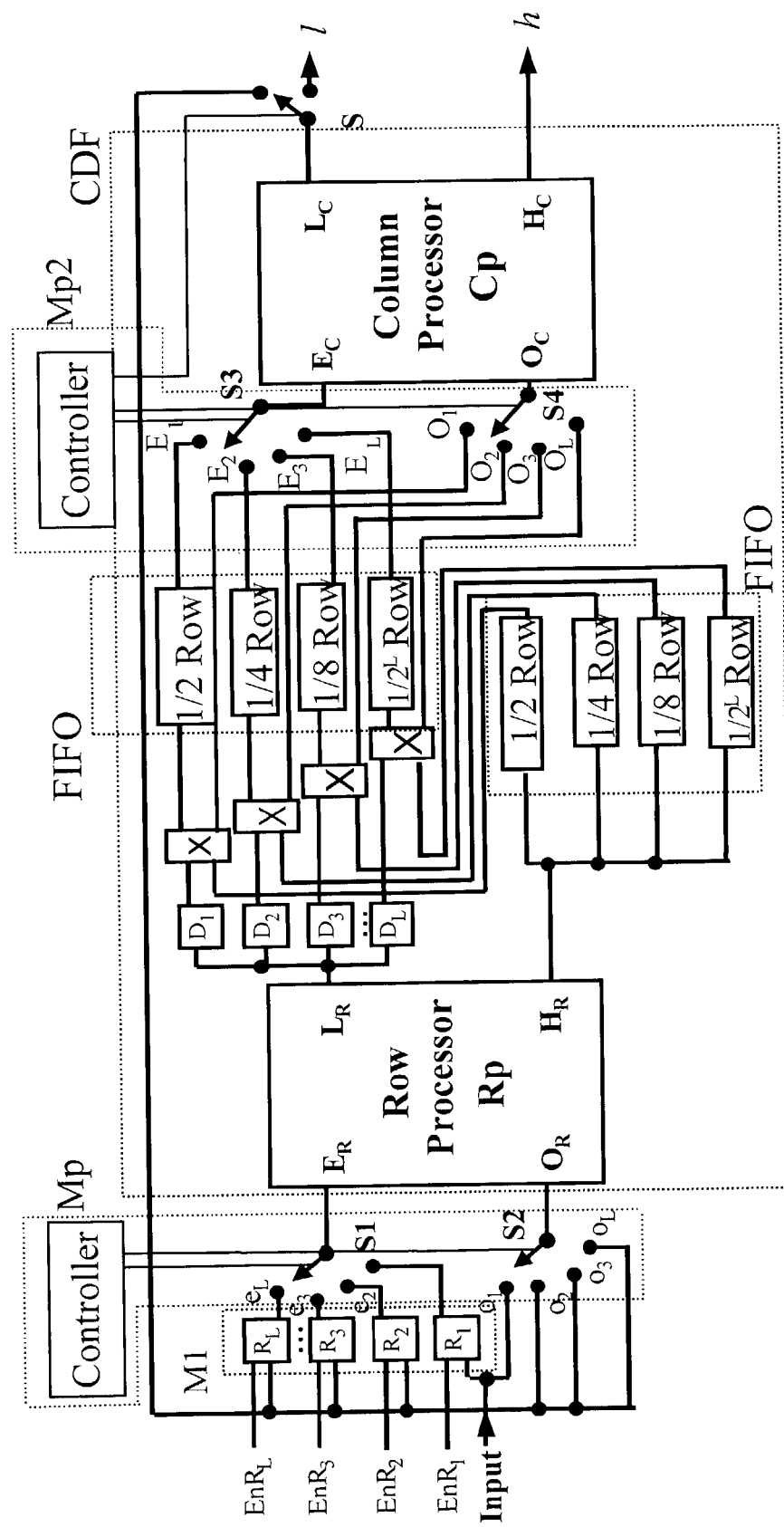
FIG. 13 depicts a 2-D recursive architecture.
Figure 14:
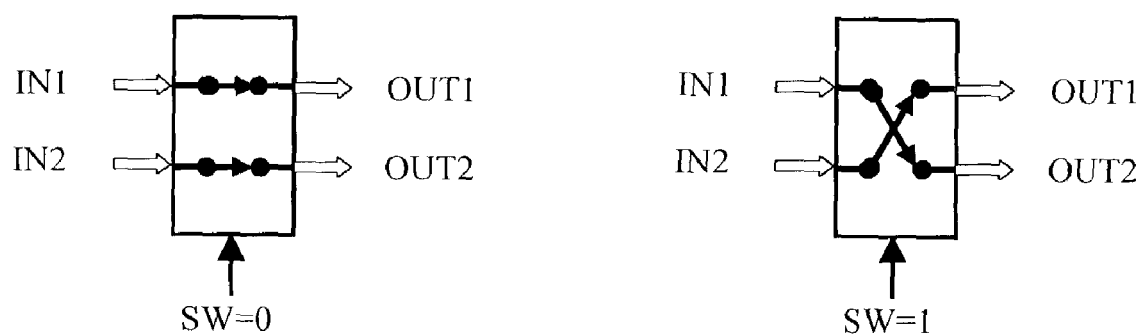
FIG. 14 depicts exchange operations.

A schematic for the 2-D RA is shown in FIG. 13. The CDF contains both the row and column processors. The enable signals $EnR_i$ are controlled by the controller as shown in FIG. 7a, registers are denoted using $R_i$, delay stages are denoted with $D_i$, and switches S1, S2, S3, S4 and S are controlled by the controller. The same controller has been depicted twice for clarity. Values $e_i$ and $o_i$, where i denotes the stage, are values to be input into the row processor Rp inputs $E_R$ and $O_R$, respectively; values $E_i$ and $O_i$ are to be input into the column processor Cp inputs $E_C$ and $O_C$, respectively. $L_R$, $H_R$ and $L_C$, $H_C$ are the low and high components from the row and column processors, respectively. The exchanges X perform the operations depicted in FIG. 14, the FIFOs are composed of rows labelled $1/2^i$ Row, where i=1,2, ..., L. The multiplexer Mp, composed of the controller and switches S1 and S2, multiplexes the signal to be fed into the row processor Rp. Note that the row DWT is similar to that of the 1-D DWT, so the datapath of the row processor is the same as for the 1-D RA. The column processor Cp is implemented by replacing the delay registers and input circuit of the 1-D RA with delay registers $D_i$, FIFOs, and the multiplexer Mp2 consisting of the controller and switches S3 and S4, as shown in FIG. 13. The interaction between the row and column processor goes as follows: When the row processor Rp is processing the even lines (assuming that it starts with $O^{th}$ row), the high and low frequency DWT coefficients are shifted into their corresponding FIFOs. When the row processor Rp is processing the odd lines, the low frequency DWT coefficients of the current lines and of the previous lines stored in the FIFOs are sent to the column processor Cp. Registers $D_i$ are used if the low frequency coefficients are generated before their high frequency counterparts. At the same time, the high frequency DWT coefficients of the current lines are shifted into their corresponding FIFOs, and the outputs of these FIFOs are shifted into the FIFOs corresponding to the low frequency. The computations are arranged in such a way that the processings of the DWT coefficients for the first and the other stages can be easily interleaved in neighboring clock cycles. Once the processing of the low frequency components is done, the outputs of both FIFOs are sent to the column processor Cp through the multiplexer Mp2. The function of the exchanges, denoted as X in FIG. 13, is to redirect the data flows between the FIFOs and the input of the column processor Cp. As shown in FIG. 14, the exchange block has two input channels, two output channels, and a control signal. When the control signal SW=0, the data from input channel 1 flows to output channel 1, and the data from input channel 2 flows to output channel 2; when SW=1, one data stream flows from input channel 2 to output channel 1, the other data stream flows from input channel 1 to output channel 2. At the low frequency output of the column processor Cp, a switch S selects the LL subband and sends it back to the row processor Rp for further decomposition.

A portion of the data flow for computing an 8×8 sample 2-D Daub-4 DWT is shown in Table 9. As described before, the first pair $e_{-1,1,1}$ and $o_{-1,1,1}$ of the first stage row transform coefficients are generated at the sixth clock cycle. They are immediately shifted into the high and low frequency FIFOs, respectively. The consecutive DWT coefficients of the same row are in turn pushed into their corresponding FIFOs in the consequent clock cycles until the end of the row (the $12^{th}$ clock cycle in this case). When the first pair of the row transform coefficients of the second row is ready, the low frequency coefficient $e_{-1,1,2}$ is sent to the odd input of the column processor, and the high frequency coefficient $o_{-1,1,2}$ is pushed into the corresponding FIFO. The first low frequency coefficient of the first row $e_{-1,1,1}$ is also popped out of the FIFO and sent to the even input of the column processor; its high frequency counterpart $o_{-1,1,1}$ is pushed to the low frequency FIFO. After 4 clock cycles, the column processor Cp generates the first pair of the 2-D DWT coefficients, of which the low frequency one $ll_{-1,1,1}$ is temporarily stored in register $R_2$. The row processor Rp starts further decomposing the low frequency DWT coefficients after the second low frequency coefficient $ll_{-1,2,1}$ is generated (at $21^{st}$ clock cycle in Table 9).

At the end of the row transform of the second row (at $20^{th}$ clock cycle in this case), both FIFOs for the first stage contain only the high frequency row transform coefficients of the first two rows, and start sending these coefficients to the column processor Cp after one clock cycle. As shown in Table 9, the calculation of the multiple stage 2-D DWT is continuous and periodic, so that control signals for the data flow are easy to generate by relatively simple logic circuits.

Similar to the 1-D RA case, the control signals for the 2-D RA are deduced from the data flow as shown in Table 9. The timing for the switch signals of the 2-D RA for lifting-based Daub-4 DWT are shown in Table 11, and the enable signals are fixed delay versions of these switch signals. Also, similar to the delay reduction method used in the 1-D RA, the delay time of the 2-D DWT can be minimized. The timing of control signals for other wavelets are similar, and can be achieved by changing the delay in Table 11.

Since the high-frequency components are processed one row after the low-frequency components, as shown in FIG. 13 and Table 9, the processing delay of the column transform for each stage is roughly one row. Also because all the stages are interleaved, the total processing time for an L-stage 2-D DWT is:

$$N \times N + N + 2 \times L \times T_d + 2^{L-1} - 1.$$

Similar to the 1-D implementation, the hardware utilization of about 90% can be achieved when L is close to $\log_2 N$.

Figure 15:
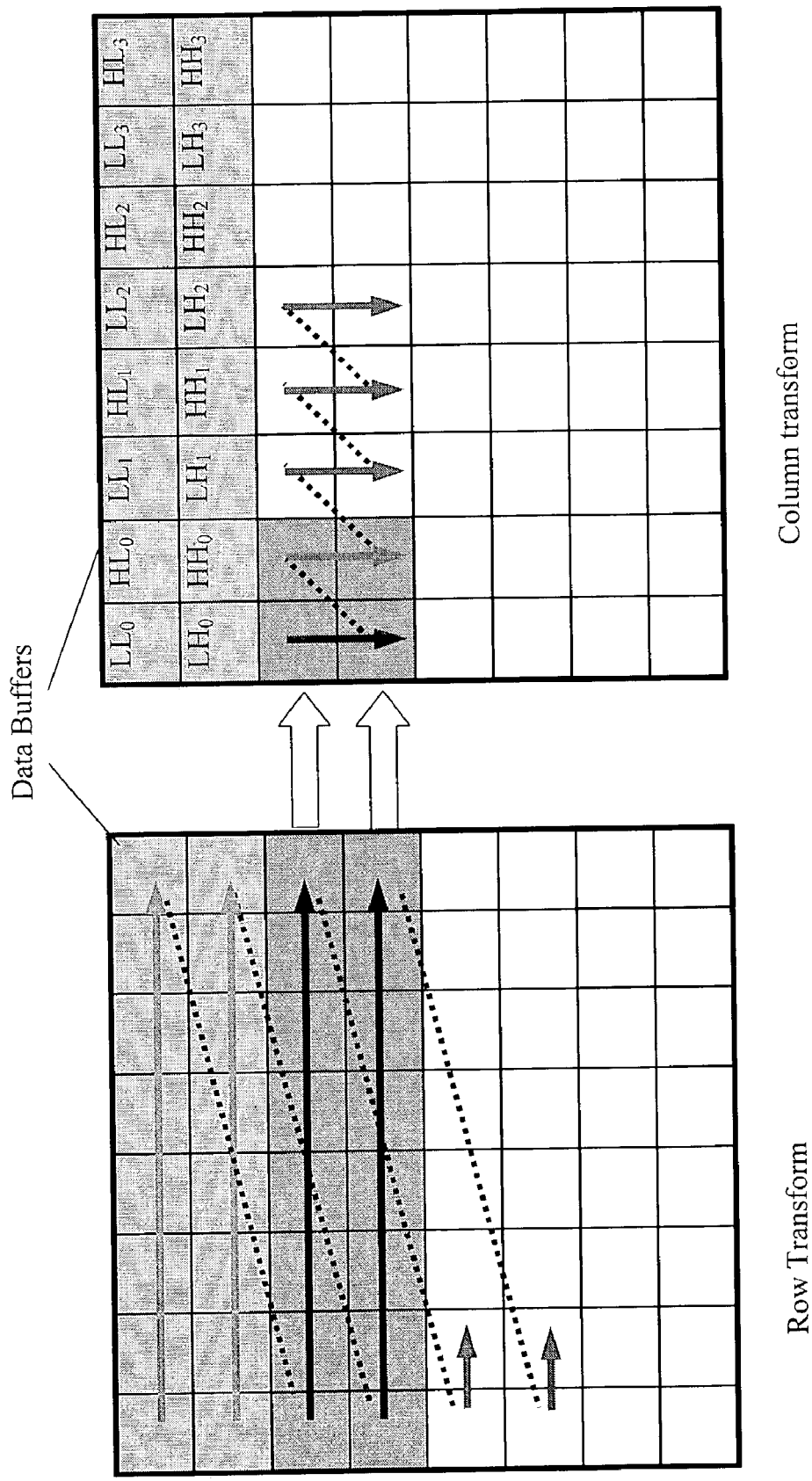
FIG. 15 depicts the scan sequence of a 2-D dual scan architecture.

In a conventional 2-D DWT algorithm, the vertical DWT is carried out only after the horizontal DWT is finished. This delay between the row and column computations limits the processing speed. The 2-D DSA shortens the delay by adopting a new scan sequence. In applications that can read two pixels per clock cycle from a data buffer, the scan sequence of the 2-D DSA shown in FIG. 15 can be used. The row processor Rp scans along two consecutive rows simultaneously, while the column processor Cp also horizontally scans in the row DWT coefficients. In this way, the column processor can start its computation as soon as the first pair of row DWT coefficients is ready. With this improvement, the row and column processors compute the same stage DWT within a few clock cycles of each other.

Figure 16:
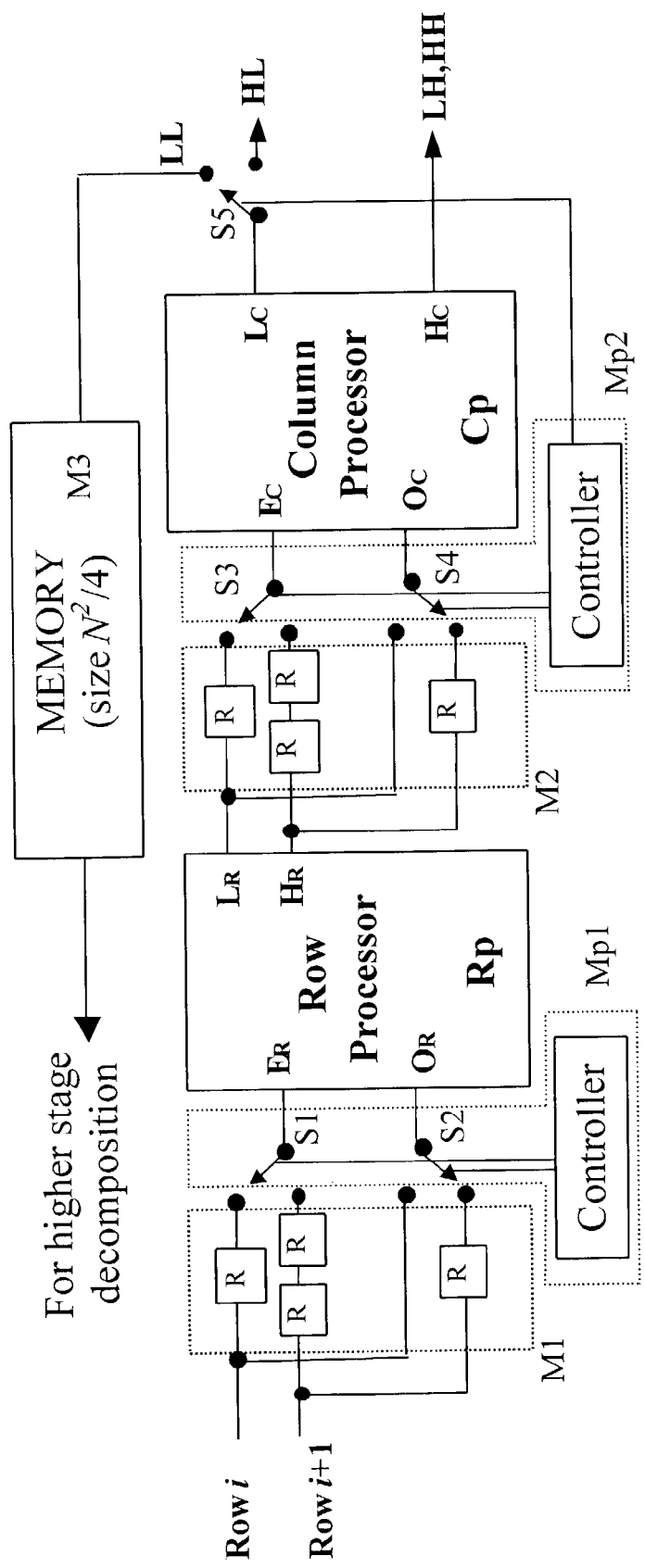
FIG. 16 depicts a 2-D dual scan architecture.

The structure of the 2-D DSA is shown in FIG. 16. The registers R of memory M1 are used to separately hold the even and odd pixels of each row, and to interleave the input pairs of each two consecutive rows using the multiplexer Mp1 composed of a controller and swithces S1 and S2 into the row processor Rp inputs ER and OR for the even and odd inputs, respectively. The computation timing of the 2-D DSA is shown in Table 13, where the delay of the row and column processor is assumed to be 1 clock cycle. The row processor of the 2-D DSA is identical to the direct implementation of the 1-D DWT. The column processor is obtained by replacing the 1-pixel delay units in the row processor with 1-row delay units. The low frequency and high frequency coefficients are outputted from the row processor Rp from the outputs $L_R$ and $H_R$, and are stored in memory M2. The multiplexer M2 interleaves the coefficients stored in memory into the column processor Cp. Once the new coefficients have been computed according to the methods in this disclosure for a 1-D DWT, the low frequency output switch of the column processor S5 which is controlled by the controller directs the LL subband of each stage DWT to the memory bank M3 through switch S5 controlled by the controller, or if it is the last stage, switch S5 outputs the coefficients outputted from output Lc as the HLsubband. The LL subimage stored in the memory will be returned to the DSA input for further decomposition after the current DWT stage is finished. The coefficients outputted from output Hc are either the LH or HH subband.

The processing time for each stage is:

$$0.5N^2(1-\tfrac{1}{4}^L)+2T_d$$

Because only a quarter of the coefficients are further decomposed, the total processing time for a L-stage 2-D DWT is:

$$(\tfrac{2}{3})N^2(1\tfrac{1}{4}^L)+2T_dL$$

Compared to a conventional implementation, the DSA uses roughly half of the time to compute the 2-D DWT, and the size of the memory for storing the row transform coefficients is reduced to M rows, where M is the number of delay units in a 1-D filter. The comparisons of the processing time and memory size are shown in Table 15 and Table 17, respectively. In Table 15, the timing for the RA is based on one input pixel per clock cycle, while the others are based on two input pixels per cycle.

As the dynamic range of the DWT coefficients increases with the number of decomposition stages, the number of bits used to represent the coefficients should be large enough to prevent overflow. Bits representing the fractional part can be added to improve the signal noise ratio (SNR) of the calculated DWT coefficients. In simulations described below, the filter coefficients and the DWT coefficients are represented in 16 bits (11-bit integer and 5-bit decimal). Therefore, 16-bit multipliers are implemented in our designs, and their results are also rounded to 16-bit. The SNR and PSNR values for the 3-stage forward DWT of the test gray level images are listed in Table 19.

The proposed architectures were synthesised and implemented for Xilinx's Virtex II FPGA XC2V250. The 1-D RA implementing the 3-stage 9/7 lifting-based DWT uses 409 logic slices out of the 1536 slices available in the FPGA. The 2-D RA implementing the 3-stage Daub-4 DWT uses 879 logic slices, and can compute the DWT of 8-bit gray level images of sizes up to 6000×6000 at 50 MHz using the built-in RAM blocks and multipliers in the FPGA. To estimate the corresponding silicon areas for ASIC designs, we used Synopsys' Design Compiler to synthesize the above architectures with TSMC's 0.18-μm standard cell library aiming for 50 MHz operation. Since the MAC unit is the critical element in the designs, higher operating frequencies can be achieved by implementing faster multipliers or by pipelining the MAC units and minimizing the routing distance of each section of the pipeline. The synthesized designs were then placed and routed by Silicon Ensemble, and the final layouts were generated by using Cadence DFII. The core size of the 1-D RA implementing the 3-stage 9/7 DWT is about $0.177\,mm^2$ (90% of which is the datapath, 10% is the controller, and the rest is memory), and the core size of the 2-D RA that calculates the 3-stage Daub-4 DWT of a 256×256 image is about $2.25\,mm^2$ (about 15% of which is the datapath, 5% is the controller, and the rest is memory). The core area could be reduced by reimplementing the delay units as register files instead of separate flip-flops, and the performance of the proposed arhcitectures can be further improved by optimizing the ciruit designs.

We have disclosed two recursive architectures and two dual scan architectures for computing the DWT based on the lifting scheme. Compared to previous implementations of the lifting-based DWT, the disclosed architectures have higher hardware utilization and shorter computation time. In addition, since the recursive architectures can continuously compute the DWT coefficients as soon as the samples become available, the memory size required for storing the intermediate results is minimized. Hence, the sizes and power consumptions of both the 1-D and 2-D recursive architectures are significantly reduced compared to other implementations. In addition, since the designs are modular, they can be easily extended to implement any separable multi-dimensional DWT by cascading N of the basic 1-D DWT processors, where N is the dimension of the DWT, by using the principles set forward in this disclosure. We also believe, on reasonable grounds, that the proposed architectures may be used to implement lifting schemes for multiwavelets.

Applications in which wavelet processing and hence the principles in this disclosure are potentially useful include but are not limited to image processing, compression, texture analysis, and noise suppression; audio processing, compression, and filtering; radar signal processing, seismic data processing, and fluid mechanics; microelectronics manufacturing, glass, plastic, steel, inspection, web and paper products, pharmaceuticals, food and agriculture.

Immaterial modifications may be made to the embodiments disclosed here without departing from the invention.

TABLE 1

Data Flow for the Three-Stage 1-D Recursive Architecture
$x_{i,j}$ is input signal, I and j denote the stage and the sequence, respectively; $e_{-1,j}$ and $o_{-1,j}$ are even and odd intermediate results of each lifting step; $l_{-1,j}$ and $h_{-1,j}$ are low and high frequency DWT coefficients

| Clk | Input | $E_1;O_1$ | $E_2;O_2$ | $E_3;O_3$ | $E_4;O_4$ | l;h | Stage |
|---|---|---|---|---|---|---|---|
| 1 | $x_{0,1}$ | | | | | | |
| 2 | $x_{0,2}$ | $x_{0,1};x_{0,2}$ | | | | | |
| 3 | $x_{0,3}$ | | $e_{-1,1};o_{-1,1}$ | | | | |
| 4 | $x_{0,4}$ | $x_{0,3};x_{0,4}$ | | $e_{-1,1};o_{-1,1}$ | | | |
| 5 | $x_{0,5}$ | | $e_{-1,2};o_{-1,2}$ | | $e_{-1,1};o_{-1,1}$ | | |
| 6 | $x_{0,6}$ | $x_{0,5};x_{0,6}$ | | $e_{-1,2};o_{-1,2}$ | | $l_{-1,1};h_{-1,1}$ | 1 |
| 7 | $x_{0,7}$ | | $e_{-1,3};o_{-1,3}$ | | $e_{-1,2};o_{-1,2}$ | | |
| 8 | $x_{0,8}$ | $x_{0,7};x_{0,8}$ | | $e_{-1,3};o_{-1,3}$ | | $l_{-1,2};h_{-1,2}$ | 1 |
| 9 | $x_{0,9}$ | $l_{-1,1};l_{-1,2}$ | $e_{-1,4};o_{-1,4}$ | | $e_{-1,3};o_{-1,3}$ | | |
| 10 | $x_{0,10}$ | $x_{0,9};x_{0,10}$ | $e_{-2,1};o_{-2,1}$ | $e_{-1,4};o_{-1,4}$ | | $l_{-1,3};h_{-1,3}$ | 1 |
| 11 | $x_{0,11}$ | | $e_{-1,5};o_{-1,5}$ | $e_{-1,1};o_{-1,2}$ | $e_{-1,4};o_{-1,4}$ | | |
| 12 | $x_{0,12}$ | $x_{0,11};x_{0,12}$ | | $e_{-1,5};o_{-1,5}$ | $e_{-1,1};e_{-1,2}$ | $l_{-1,4};h_{-1,4}$ | 1 |
| 13 | $x_{0,13}$ | $l_{-1,3};l_{-1,4}$ | $e_{-1,6};o_{-1,6}$ | | $e_{-1,5};o_{-1,5}$ | $l_{-2,1};h_{-2,1}$ | 2 |
| 14 | $x_{0,14}$ | $x_{0,13};x_{0,14}$ | $e_{-2,2};o_{-2,2}$ | $e_{-1,6};o_{-1,6}$ | | $l_{-1,5};h_{-1,5}$ | 1 |

TABLE 1-continued

Data Flow for the Three-Stage 1-D Recursive Architecture
$x_{i,j}$ is input signal, I and j denote the stage and the sequence, respectively; $e_{-I,j}$ and $o_{-I,j}$ are even and odd intermediate results of each lifting step; $l_{-I,j}$ and $h_{-I,j}$ are low and high frequency DWT coefficients

| Clk | Input | $E_1;O_1$ | $E_2;O_2$ | $E_3;O_3$ | $E_4;O_4$ | l;h | Stage |
|---|---|---|---|---|---|---|---|
| 15 | $x_{0,15}$ | | $e_{-1,7};o_{-1,7}$ | $e_{-2,2};o_{-2,2}$ | $e_{-1,6};o_{-1,6}$ | | |
| 16 | $x_{0,16}$ | $x_{0,15};x_{0,16}$ | | $e_{-1,7};o_{-1,7}$ | $e_{-2,2};o_{-2,2}$ | $l_{-1,6};h_{-1,6}$ | 1 |
| 17 | $x_{0,17}$ | $l_{-1,5};l_{-1,6}$ | $e_{-1,8};o_{-1,8}$ | | $e_{-1,7};o_{-1,7}$ | $l_{-2,2};h_{-2,2}$ | 2 |
| 18 | $x_{0,18}$ | $x_{0,17};x_{0,18}$ | $e_{-2,3};o_{-2,3}$ | $e_{-1,8};o_{-1,8}$ | | $l_{-1,7};h_{-1,7}$ | 1 |
| 19 | $x_{0,19}$ | $l_{-2,1};l_{-2,2}$ | $e_{-1,9};o_{-1,9}$ | $e_{-2,3};o_{-2,3}$ | $e_{-1,8};o_{-1,8}$ | | |
| 20 | $x_{0,20}$ | $x_{0,19};x_{0,20}$ | $e_{-3,1};o_{-3,1}$ | $e_{-1,9};o_{-1,9}$ | $e_{-2,3};o_{-2,3}$ | $l_{-1,8};h_{-1,8}$ | 1 |
| 21 | $x_{0,21}$ | $l_{-1,7};h_{-1,8}$ | $e_{-1,10};o_{-1,10}$ | $e_{-3,1};o_{-3,1}$ | $e_{-1,9};o_{-1,9}$ | $l_{-2,3};h_{-2,3}$ | 2 |
| 22 | $x_{0,22}$ | $x_{0,21};x_{0,22}$ | $e_{-2,4};o_{-2,4}$ | $e_{-1,10};o_{-1,10}$ | $e_{-3,1};o_{-3,1}$ | $l_{-1,9};h_{-1,9}$ | 1 |
| 22 | $x_{0,22}$ | $x_{0,21};x_{0,22}$ | $e_{-1,11};o_{-1,11}$ | $e_{-2,4};o_{-2,4}$ | $e_{-1,10};o_{-1,10}$ | $l_{-3,1};h_{-3,1}$ | 3 |

TABLE 3

Enable Signals for the Input Registers (k is the sample index) of the 1-D RA Implementing the D4 DWT

| Time, $T_{en}$ (in clock cycles) | Enable Signals | | |
|---|---|---|---|
| 2k | $EnR_1$ | — | $EnD_1$** |
| 4k + 4 | $EnR_2$ | — | $EnD_2$** |
| 8k + 9 | $EnR_3$ | $EnR'_3$* | $EnD_3$** |
| $2^L k + 3 \times 2^{L-2} + 2^{L-1} - 1$ | $EnR_L$ | $EnR'_L$* | $EnD_L$** |

*The actual times are: $T_{en} + 2^{L-1}$.
**The actual times are: $T_{en} + 2^{L-1}$ + Latency from S2 to S3.

TABLE 5

Input Switch Control Timing for the 1-D RA Implementing D4 DWT

| Time, $T_s$ (in clock cycles) | Switch Positions | | |
|---|---|---|---|
| | S1 | S2 | S3* |
| 2k + 1 | $e_1$ | $o_1$ | $q_1$ |
| 4k + 6 | $e_2$ | $o_2$ | $q_2$ |

TABLE 5-continued

Input Switch Control Timing for the 1-D RA Implementing D4 DWT

| Time, $T_s$ (in clock cycles) | Switch Positions | | |
|---|---|---|---|
| | S1 | S2 | S3* |
| 8k + 16 | $e_3$ | $o_3$ | $q_3$ |
| $2^L k + 3 \times 2^{L-2} + 2^L$ + Latency | $e_L$ | $o_L$ | $q_L$ |

*The actual times are: $T_s + 2$.

TABLE 7

Computation Time and Hardware Utilization for 1-D Architectures

| Architecture | Computation Time (clock cycles) | Hardware Utilization |
|---|---|---|
| RA | $N + T_d L$ | 50%-90% |
| Direct implementation | $2N(1 - 1/2^L) + T_{delay} L$ | 50% |
| Folded | $2N(1 - 1/2^L) + T_{delay} L$ | ≈100% |

N: Number of input samples.
$T_d$, $T_{delay}$: Circuit delay.
L: Number of DWT stages.

TABLE 9

Data Flow for the Three-Stage 2-D Recursive Architecture
$x_{i,j,k}$ is input signal, I, j and k denote the stage, the row and column sequences, respectively; $e_{-I,j,k}$ and $o_{-I,j,k}$ are even and odd intermediate results of each lifting step; $l_{-I,j,k}$ and $h_{-I,j,k}$ are low and high frequency DWT coefficients

| | | Row Processor | | FIFOs for Stage 1 | | Column Processor | | |
|---|---|---|---|---|---|---|---|---|
| Clk | Input | $E_R;O_R$ | $L_R;H_R$ | High Frequency | Low Frequency | $E_C;O_C$ | Output | Stage |
| 1 | $x_{0,1,1}$ | | | | | | | |
| 2 | $x_{0,2,1}$ | $x_{0,1,1};x_{0,2,1}$ | | | | | | |
| 3 | $x_{0,3,1}$ | | | | | | | |
| 4 | $x_{0,4,1}$ | $x_{0,3,1};x_{0,4,1}$ | | | | | | |
| 5 | $x_{0,5,1}$ | | | | | | | |
| 6 | $x_{0,6,1}$ | $x_{0,5,1};x_{0,6,1}$ | $e_{-1,1,1};o_{-1,1,1}$ | $e_{-1,1,1}$ | | $o_{-1,1,1}$ | | |
| 7 | $x_{0,7,1}$ | | | | | | | |
| 8 | $x_{0,8,1}$ | $x_{0,7,1};x_{0,8,1}$ | $e_{-1,2,1};o_{-1,2,1}$ | $e_{-1,1,1};e_{-1,2,1}$ | | $o_{-1,1,1};o_{-1,2,1}$ | | |
| 9 | $x_{0,1,2}$ | | | | | | | |
| 10 | $x_{0,2,2}$ | $x_{0,1,2};x_{0,2,2}$ | $e_{-1,3,1};o_{-1,3,1}$ | $e_{-1,1,1};e_{-1,2,1};e_{-1,3,1}$ | | $o_{-1,1,1};o_{-1,2,1};o_{-1,3,1}$ | | |
| 11 | $x_{0,3,2}$ | | | | | | | |

TABLE 9-continued

Data Flow for the Three-Stage 2-D Recursive Architecture
$x_{i,j,k}$ is input signal, I, j and k denote the stage, the row and column sequences, respectively; $e_{-I,j,k}$ and $o_{-I,j,k}$ are even and odd intermediate results of each lifting step; $l_{-I,j,k}$ and $h_{-I,j,k}$ are low and high frequency DWT coefficients

| | | Row Processor | | FIFOs for Stage 1 | | Column Processor | | |
| --- | --- | --- | --- | --- | --- | --- | --- | --- |
| Clk | Input | $E_R;O_R$ | $L_R;H_R$ | High Frequency | Low Frequency | $E_C;O_C$ | Output | Stage |
| 12 | $x_{0,4,2}$ | $x_{0,3,2};x_{0,4,2}$ | $e_{-1,4,1};o_{-1,4,1}$ | $e_{-1,1,1};e_{-1,2,1};e_{-1,3,1};$ $e_{-1,4,1}$ | $o_{-1,1,1};o_{-1,2,1};o_{-1,3,1};$ $o_{-1,4,1}$ | | | |
| 13 | $x_{0,5,2}$ | | | | | | | |
| 14 | $x_{0,6,2}$ | $x_{0,5,2};x_{0,6,2}$ | $e_{-1,1,2};o_{-1,1,2}$ | $e_{-1,2,1};e_{-1,3,1};e_{-1,4,1};$ $o_{-1,1,1}$ | $o_{-1,2,1};o_{-1,3,1};o_{-1,4,1};$ $o_{-1,1,2}$ | $e_{-1,1,1};e_{-1,1,2}$ | | |
| 15 | $x_{0,7,2}$ | | | | | | | |
| 16 | $x_{0,8,2}$ | $x_{0,7,2};x_{0,8,2}$ | $e_{-1,2,2};o_{-1,2,2}$ | $e_{-1,3,1};e_{-1,4,1};o_{-1,1,1};$ $o_{-1,2,1}$ | $o_{-1,3,1};o_{-1,4,1};o_{-1,1,2};$ $o_{-1,2,2}$ | $e_{-1,2,1};e_{-1,2,2}$ | | |
| 17 | $x_{0,1,3}$ | | | | | | | |
| 18 | $x_{0,2,3}$ | $x_{0,1,3};x_{0,2,3}$ | $e_{-1,3,2};o_{-1,3,2}$ | $e_{-1,4,1};o_{-1,1,1};o_{-1,2,1};$ $o_{-1,3,1}$ | $o_{-1,4,1};o_{-1,1,2};o_{-1,2,2};$ $o_{-1,3,2}$ | $e_{-1,3,1};e_{-1,3,2}$ | $ll_{-1,1,1};lh_{-1,1,1}$ | 1 |
| 19 | $x_{0,3,3}$ | | | | | | | |
| 20 | $x_{0,4,3}$ | $x_{0,3,3};x_{0,4,3}$ | $e_{-1,4,2};o_{-1,4,2}$ | $o_{-1,1,1};o_{-1,2,1};o_{-1,3,1};$ $o_{-1,4,1}$ | $o_{-1,1,2};o_{-1,2,2};o_{-1,3,2};$ $o_{-1,4,2}$ | $e_{-1,4,1};e_{-1,4,2}$ | $ll_{-1,2,1};lh_{-1,2,1}$ | 1 |
| 21 | $x_{0,5,3}$ | $ll_{-1,1,1};ll_{-1,2,1}$ | | | | | | |
| 22 | $x_{0,6,3}$ | $x_{0,5,3};x_{0,6,3}$ | $e_{-1,1,3};o_{-1,1,3}$ | $o_{-1,2,1};o_{-1,3,1};o_{-1,4,1};$ $e_{-1,1,3}$ | $o_{-1,2,2};o_{-1,3,2};o_{-1,4,2};$ $o_{-1,1,3}$ | $o_{-1,1,1};o_{-1,1,2}$ | $ll_{-1,3,1};lh_{-1,3,1}$ | 1 |
| 22 | $x_{0,7,3}$ | | | | | | | |
| 23 | $x_{0,8,3}$ | $x_{0,7,3};x_{0,8,3}$ | $e_{-1,2,3};o_{-1,2,3}$ | $o_{-1,3,1};o_{-1,4,1};e_{-1,1,3};$ $e_{-1,2,3}$ | $o_{-1,3,2};o_{-1,4,2};o_{-1,1,3};$ $o_{-1,2,3}$ | $o_{-1,2,1};o_{-1,2,2}$ | $ll_{-1,4,1};lh_{-1,4,1}$ | 1 |
| 24 | $x_{0,1,4}$ | $ll_{-1,3,1};ll_{-1,4,1}$ | $e_{-2,1,1};o_{-2,1,1}$ | | | | | |
| 25 | $x_{0,2,4}$ | $x_{0,1,4};x_{0,2,4}$ | $e_{-1,3,3};o_{-1,3,3}$ | $o_{-1,4,1};e_{-1,1,3};e_{-1,2,3};$ $e_{-1,3,3}$ | $o_{-1,4,2};o_{-1,1,3};o_{-1,2,3};$ $o_{-1,3,3}$ | $o_{-1,3,1};o_{-1,3,2}$ | $hl_{-1,1,1};$ $hh_{-1,1,1}$ | 1 |
| 26 | $x_{0,3,4}$ | | | | | | | |
| 27 | $x_{0,4,4}$ | $x_{0,3,4};x_{0,4,4}$ | $e_{-1,4,3};o_{-1,4,3}$ | $e_{-1,1,3};e_{-1,2,3};e_{-1,3,3};$ $e_{-1,4,3}$ | $o_{-1,1,3};o_{-1,2,3};o_{-1,3,3};$ $o_{-1,4,3}$ | $o_{-1,4,1};o_{-1,4,2}$ | $hl_{-1,2,1};hh_{-1,2,1}$ | 1 |
| 28 | $x_{0,5,4}$ | | $e_{-2,2,1};o_{-2,2,1}$ | | | | | |
| 29 | $x_{0,6,4}$ | $x_{0,5,4};x_{0,6,4}$ | $e_{-1,1,4};o_{-1,1,4}$ | $e_{-1,2,3};e_{-1,3,3};e_{-1,4,3};$ $o_{-1,1,3}$ | $o_{-1,2,3};o_{-1,3,3};o_{-1,4,3};$ $o_{-1,1,4}$ | $e_{-1,1,3};e_{-1,1,4}$ | $hl_{-1,3,1};$ $hh_{-1,3,1}$ | 1 |
| 30 | $x_{0,7,4}$ | | | | | | | |
| 31 | $x_{0,8,4}$ | $x_{0,7,4};x_{0,8,4}$ | $e_{-1,2,4};o_{-1,2,4}$ | $e_{-1,3,3};e_{-1,4,3};o_{-1,1,3};$ $o_{-1,2,3}$ | $o_{-1,3,3};o_{-1,4,3};o_{-1,1,4};$ $o_{-1,2,4}$ | $e_{-1,2,3};e_{-1,2,4}$ | $hl_{-1,4,1};hh_{-1,4,1}$ | 1 |
| 32 | $x_{0,1,5}$ | | | | | | | |
| 33 | $x_{0,2,5}$ | $x_{0,1,5};x_{0,2,5}$ | $e_{-1,3,4};o_{-1,3,4}$ | $e_{-1,4,3};o_{-1,1,3};o_{-1,2,3};$ $o_{-1,3,3}$ | $o_{-1,4,3};o_{-1,1,4};o_{-1,2,4};$ $o_{-1,3,4}$ | $e_{-1,3,3};e_{-1,3,4}$ | $ll_{-1,1,2};lh_{-1,1,2}$ | 1 |
| 34 | $x_{0,3,5}$ | | | | | | | |
| 35 | $x_{0,4,5}$ | $x_{0,3,5};x_{0,4,5}$ | $e_{-1,4,4};o_{-1,4,4}$ | $o_{-1,1,3};o_{-1,2,3};o_{-1,3,3};$ $o_{-1,4,3}$ | $o_{-1,1,4};o_{-1,2,4};o_{-1,3,4};$ $o_{-1,4,4}$ | $e_{-1,4,3};e_{-1,4,4}$ | $ll_{-1,2,2};lh_{-1,2,2}$ | 1 |
| 36 | $x_{0,5,5}$ | $ll_{-1,1,2};ll_{-1,2,2}$ | | | | | | |
| 37 | $x_{0,6,5}$ | $x_{0,5,5};x_{0,6,5}$ | $e_{-1,1,5};o_{-1,1,5}$ | $o_{-1,2,3};o_{-1,3,3};o_{-1,4,3};$ $e_{-1,1,5}$ | $o_{-1,2,4};o_{-1,3,4};o_{-1,4,4};$ $o_{-1,1,5}$ | $o_{-1,1,3};o_{-1,1,4}$ | $ll_{-1,3,2};lh_{-1,3,2}$ | 1 |
| 38 | $x_{0,7,5}$ | | | | | | | |
| 39 | $x_{0,8,5}$ | $x_{0,7,5};x_{0,8,5}$ | $e_{-1,2,5};o_{-1,2,5}$ | $o_{-1,3,3};o_{-1,4,3};e_{-1,1,5};$ $e_{-1,2,5}$ | $o_{-1,3,4};o_{-1,4,4};o_{-1,1,5};$ $o_{-1,2,5}$ | $o_{-1,2,3};o_{-1,2,4}$ | $ll_{-1,4,2};lh_{-1,4,2}$ | 1 |
| 40 | $x_{0,1,6}$ | $ll_{-1,3,2};ll_{-1,4,2}$ | $e_{-2,1,2};o_{-2,1,2}$ | | | $e_{-2,1,1};e_{-2,1,2}$ | | |
| 41 | $x_{0,2,6}$ | $x_{0,1,6};x_{0,2,6}$ | $e_{-1,3,5};o_{-1,3,5}$ | $o_{-1,4,3};e_{-1,1,5};e_{-1,2,5};$ $e_{-1,3,5}$ | $o_{-1,4,4};o_{-1,1,5};o_{-1,2,5};$ $o_{-1,3,5}$ | $o_{-1,3,3};o_{-1,3,4}$ | $hl_{-1,1,2};$ $hh_{-1,1,2}$ | 1 |
| 42 | $x_{0,3,6}$ | | | | | | | |
| 43 | $x_{0,4,6}$ | $x_{0,3,6};x_{0,4,6}$ | $e_{-1,4,5};o_{-1,4,5}$ | $e_{-1,1,5};e_{-1,2,5};e_{-1,3,5};$ $e_{-1,4,5}$ | $o_{-1,1,5};o_{-1,2,5};o_{-1,3,5};$ $o_{-1,4,5}$ | $o_{-1,4,3};o_{-1,4,4}$ | $hl_{-1,2,2};hh_{-1,2,2}$ | 1 |
| 44 | $x_{0,5,6}$ | | $e_{-2,2,2};o_{-2,2,2}$ | | | $e_{-2,2,1};e_{-2,2,2}$ | $ll_{-2,1,1};lh_{-2,1,1}$ | 2 |
| 45 | $x_{0,6,6}$ | $x_{0,5,6};x_{0,6,6}$ | $e_{-1,1,6};o_{-1,1,6}$ | $o_{-1,2,5};e_{-1,3,5};e_{-1,4,5};$ $o_{-1,1,5}$ | $o_{-1,2,5};o_{-1,3,5};o_{-1,4,5};$ $o_{-1,1,6}$ | $e_{-1,1,5};e_{-1,1,6}$ | $hl_{-1,3,2};$ $hh_{-1,3,2}$ | 1 |
| 46 | $x_{0,7,6}$ | | | | | | | |
| 47 | $x_{0,8,6}$ | $x_{0,7,6};x_{0,8,6}$ | $e_{-1,2,6};o_{-1,2,6}$ | $e_{-1,3,5};e_{-1,4,5};o_{-1,1,5};$ $o_{-1,2,5}$ | $o_{-1,3,5};o_{-1,4,5};o_{-1,1,6};$ $o_{-1,2,6}$ | $e_{-1,2,5};e_{-1,2,6}$ | $hl_{-1,4,2};hh_{-1,4,2}$ | 1 |
| 48 | $x_{0,1,7}$ | | | | | $o_{-2,1,1};o_{-2,1,2}$ | $ll_{-2,2,1};lh_{-2,2,1}$ | 2 |
| 49 | $x_{0,2,7}$ | $x_{0,1,7};x_{0,2,7}$ | $e_{-1,3,6};o_{-1,3,6}$ | $e_{-1,4,5};o_{-1,1,5};o_{-1,2,5};$ $o_{-1,3,5}$ | $o_{-1,4,5};o_{-1,1,6};o_{-1,2,6};$ $o_{-1,3,6}$ | $e_{-1,3,5};e_{-1,3,6}$ | $ll_{-1,1,3};lh_{-1,1,3}$ | 1 |
| 50 | $x_{0,3,7}$ | | | | | | | |
| 51 | $x_{0,4,7}$ | $x_{0,3,7};x_{0,4,7}$ | $e_{-1,4,6};o_{-1,4,6}$ | $o_{-1,1,5};o_{-1,2,5};o_{-1,3,5};$ $o_{-1,4,5}$ | $o_{-1,1,6};o_{-1,2,6};o_{-1,3,6};$ $o_{-1,4,6}$ | $e_{-1,4,5};e_{-1,4,6}$ | $ll_{-1,2,3};lh_{-1,2,3}$ | 1 |
| 52 | $x_{0,5,7}$ | $ll_{-1,1,3};ll_{-1,2,3}$ | | | | | $hl_{-2,1,1};$ $hh_{-2,1,1}$ | 2 |

TABLE 11

Switch Control Timing for the 2-D RA Implementing Daub-4 DWT

| Time, $T_s$ (in clock cycles) | Switch Positions S1 | S2 | Time, $T_s$ (in clock cycles) | Switch Positions S3* | S4 |
|---|---|---|---|---|---|
| $2k + 1$ | $e_1$ | $o_1$ | $2(l + 1)N + 2k + 6$ | $E_1$ | $O_1$ |
| $2(l + 1)N + 4k + 9$ | $e_2$ | $o_2$ | $4(l + 1)N + 4k + 14$ | $E_2$ | $O_2$ |
| $4(l + 1)N + 8k + 17$ | $e_3$ | $o_3$ | $8(l + 1)N + 8k + 22$ | $E_3$ | $O_3$ |
| $2^{L-1}(l + 1)N + 2^L$ | $e_L$ | $o_L$ | $2^L(l + 1)N + 2^L$ | $E_L$ | $O_L$ |
| $k + 1 + 2T_dL$ | | | $k + 3 + 2T_dL$ | | |

TABLE 13

Data Flow for the 2-D Dual Scan Architecture
$x_{i,j}$ is input signal, I, j the row and column sequences, respectively;
$e_{I,j}$ and $o_{I,j}$ are even and odd intermediate
results of each lifting step; $l_{I,j}$ and $h_{I,j}$ are
low and high frequency DWT coefficients

| | | Row Processor | | Column Processor | |
|---|---|---|---|---|---|
| Clk | Input | $E_R;O_R$ | $L_R;H_R$ | $E_c;O_c$ | $L_c;H_c$ |
| 1 | $x_{1,1}\ x_{1,2}$ | | | | |
| 2 | $x_{2,1}\ x_{2,2}$ | $x_{1,1};x_{2,1}$ | | | |
| 3 | $x_{3,1}\ x_{3,2}$ | $x_{1,2};x_{2,2}$ | $e_{1,1};o_{1,1}$ | | |
| 4 | $x_{4,1}\ x_{4,2}$ | $x_{3,1};x_{4,1}$ | $e_{1,2};o_{1,2}$ | $e_{1,1};e_{1,2}$ | |
| 5 | | $x_{3,2};x_{4,2}$ | $e_{2,1};o_{2,1}$ | $o_{1,1};o_{1,2}$ | $ll_{1,1};lh_{1,1}$ |
| 6 | | | $e_{2,2};o_{2,2}$ | $e_{2,1};e_{2,2}$ | $hl_{1,1};hh_{1,1}$ |
| 7 | | | | $o_{2,1};o_{2,2}$ | $ll_{2,1};lh_{2,1}$ |
| 8 | | | | | $hl_{2,1};hh_{2,1}$ |

TABLE 15

Computation Time and Hardware Utilization for 2-D Architectures

| Architecture (9/7 DWT) | Computation Time (clock cycles) | Hardware Utilization |
|---|---|---|
| RA | $N^2 + N + 2LT_d + 2^{L-1} - 1$ | 50%-70% |
| DS | $(2/3)N^2(1 - 1/4^L) + 2T_dL$ | ≈100% |
| Direct implementation | $(4/3)N^2(1 - 1/4^L) + 2T_dL$ | 50% |

N × N: Size of the input image.
$T_d$, $T_{delay}$: Circuit delay.
L: Number of DWT stages

TABLE 17

Comparison of Memory Size for 2-D Architectures

| Architecture | Memory Size |
|---|---|
| RA for 9/7 wavelet | 4N |
| RA for D4 wavelet | 10N |
| DSA for 9/7 wavelet | $N^2 + 4N$ |
| Direct implementation | $(5/4)N^2$ |

N × N: Size of the input image.
$T_d$, $T_{delay}$: Circuit delay.
L: Number of DWT stages

TABLE 19

SNR/PSNR Values for 3-stage forward DWT

| | Lena | | Barbara | |
|---|---|---|---|---|
| | SNR | PSNR | SNR | PSNR |
| Daub-4 | 69.6529 | 75.32 | 69.2755 | 75.18 |
| 9/7 | 69.1437 | 74.85 | 68.7880 | 74.73 |

What is claimed is:

1. Apparatus for digital signal processing, the apparatus comprising:
a cascade of digital filters connected to receive a sampled input signal or samples from a data stream and having at least an output, in which the data stream is taken from the at least an output of the cascade of digital filters and in which the digital filters implement a transform decomposed into lifting steps;
the cascade of digital filters being configured to operate on pairs of samples from the sampled input signal while leaving available idle cycles; and
a multiplexer for multiplexing the samples of the data stream with the sampled input signal, the multiplexer being configured for interleaved processing of the samples of the data stream with the sampled input signal by the cascade of digital filters during the available idle cycles.

2. The apparatus of claim 1 further comprising:
a buffer memory connected to receive samples from the data stream and output the samples to the cascade of digital filters for processing of the data stream that is obtained by interleaving the samples from the data stream with the sampled input signal.

3. The apparatus of claim 1 in which the multiplexer is implemented using a switch and a controller for the switch, and the controller is also connected to the buffer memory to control the loading of the buffer memory.

4. The apparatus of claim 1 in which the cascade of digital filters implements a one-dimensional discrete wavelet transform.

5. The apparatus of claim 4 in which the one-dimensional discrete wavelet transform is a Daubechies-4 wavelet transform.

6. The apparatus of claim 4 in which the one-dimensional discrete wavelet transform is a 9/7 wavelet transform.

7. The apparatus of claim 1 in which the cascade of digital filters implements filtering steps corresponding to Laurent polynomials.

8. The apparatus of claim 1 in which the cascade of digital filters implements a two-dimensional transform that is decomposed into a first one-dimensional transform followed by a second one-dimensional transform.

9. The apparatus of claim 8 in which the cascade of digital filters comprises a first cascade of digital filters to calculate the first one-dimensional transform and a second cascade of digital filters to calculate the second one-dimensional transform.

10. The apparatus of claim 8 in which the first one-dimensional transform is a row transform and the second one-dimensional transform is a column transform and the sampled input signal is organized as a two-dimensional array with one or more rows and one or more columns.

11. The apparatus of claim 8 in which the first transform is a column transform and the second transform is a row transform and the input data is organized as a two-dimensional away with one or more rows and one or more columns.

12. The apparatus of claim 1 in which the cascade of digital filters implements an N-dimensional transform, where N is greater than 2, and the number of digital filter cascades is N.

13. A method of transforming a sampled input signal into a transformed output signal, the method comprising the steps of:

operating on pairs of the sampled input signal with a cascade of digital filters that implements a transform decomposed into lifting steps to provide an output while leaving available idle cycles in the operation of the cascade of digital filters on the sampled input signal; and operating on samples from the output using the cascade of digital filters, where the samples from the output have been interleaved with the sampled input signal for processing during the available idle cycles.

14. The method of claim 13 in which the sampled input signal comprises samples from a two-dimensional image.

15. The method of claim 14 in which the cascade of digital filters implements JPEG2000 compression.

* * * * *

UNITED STATES PATENT AND TRADEMARK OFFICE
CERTIFICATE OF CORRECTION

| | | |
|---|---|---|
| PATENT NO. | : 7,480,416 B2 | Page 1 of 1 |
| APPLICATION NO. | : 10/435499 | |
| DATED | : January 20, 2009 | |
| INVENTOR(S) | : H. Liao et al. | |

It is certified that error appears in the above-identified patent and that said Letters Patent is hereby corrected as shown below:

| COLUMN | LINE | ERROR |
|---|---|---|
| 23 | 2 | "away" should read --array-- |

Signed and Sealed this

Twenty-second Day of December, 2009

David J. Kappos
*Director of the United States Patent and Trademark Office*